(12) United States Patent
Miyashita et al.

(10) Patent No.: US 12,551,367 B2
(45) Date of Patent: Feb. 17, 2026

(54) TEMPERATURE CONTROL AGENT, AND HEATING COMPOSITION, PACKAGING MATERIAL, AND WARMING MATERIAL EACH COMPRISING SAME

(71) Applicant: FERRIC INC., Tokyo (JP)

(72) Inventors: Eiji Miyashita, Tokyo (JP); Shoichi Tsuji, Tokyo (JP); Hirokazu Miyashita, Tokyo (JP); Masayoshi Ikezawa, Tokyo (JP)

(73) Assignee: FERRIC INC., Tokyo (JP)

( * ) Notice: Subject to any disclaimer, the term of this patent is extended or adjusted under 35 U.S.C. 154(b) by 775 days.

(21) Appl. No.: 15/519,835

(22) PCT Filed: Oct. 16, 2015

(86) PCT No.: PCT/JP2015/079374
§ 371 (c)(1),
(2) Date: Apr. 17, 2017

(87) PCT Pub. No.: WO2016/063815
PCT Pub. Date: Apr. 28, 2016

(65) Prior Publication Data
US 2017/0239085 A1    Aug. 24, 2017

(30) Foreign Application Priority Data

Oct. 20, 2014  (JP) ................................. 2014-213678
Apr. 1, 2015   (JP) ................................. 2015-074826

(51) Int. Cl.
*A61F 7/03*     (2006.01)
*A61H 39/06*    (2006.01)
(Continued)

(52) U.S. Cl.
CPC ............... *A61F 7/034* (2013.01); *A61F 7/03* (2013.01); *A61H 39/06* (2013.01); *C09K 5/18* (2013.01); *A61F 2007/023* (2013.01)

(58) Field of Classification Search
CPC ...... A61F 7/034; A61F 7/03; A61F 2007/023; A61F 2007/0098; A61F 2007/0258;
(Continued)

(56) References Cited

U.S. PATENT DOCUMENTS 5,984,953 A    11/1999  Sabin et al.
6,336,935 B1 *  1/2002  Davis ...................... A61F 7/034
                                                                607/112

(Continued)

FOREIGN PATENT DOCUMENTS

CN    1310600       8/2001
CN    103096848     5/2013
(Continued)

OTHER PUBLICATIONS

Kidokoro, Method for producing heat storage elastomer molding, 2010, pp. 1-23.*
(Continued)

*Primary Examiner* — Kaitlyn E Smith
*Assistant Examiner* — Yasamin Ekrami
(74) *Attorney, Agent, or Firm* — Grüneberg and Myers PLLC

(57) ABSTRACT

A means for controlling the temperature of a warming material includes an air-permeable film or the like. The warming material includes the temperature control means and a heating composition. The temperature control means for controlling the heating temperature of the warming material includes one or more aliphatic compounds that have a melting point of 35-65° C. and a solubility in water (g/100 mL) at 20° C. of 5 or less.

27 Claims, 11 Drawing Sheets

(51) Int. Cl.
*C09K 5/18* (2006.01)
*A61F 7/02* (2006.01)

(58) Field of Classification Search
CPC ...... A61F 2007/0257; A61F 2007/0207; A61F 2007/0226; A61F 2007/038; C09K 5/18; A61H 39/06
See application file for complete search history.

(56) References Cited

U.S. PATENT DOCUMENTS

| | | | |
|---|---|---|---|
| 2003/0008578 A1* | 1/2003 | Brooks | C09K 5/063 442/394 |
| 2008/0141437 A1* | 6/2008 | Braunecker | A61F 7/03 2/206 |
| 2011/0190714 A1 | 8/2011 | Oda et al. | |
| 2013/0008425 A1 | 1/2013 | Matsuo | |
| 2013/0345649 A1* | 12/2013 | Stockley, III | A61F 7/034 604/304 |
| 2014/0109891 A1 | 4/2014 | Sonoda et al. | |
| 2020/0360179 A1 | 11/2020 | Ikezawa et al. | |

FOREIGN PATENT DOCUMENTS

| | | | |
|---|---|---|---|
| CN | 103387737 | * | 11/2013 |
| CN | 103555284 | | 2/2014 |
| CN | 103648447 | | 3/2014 |
| CN | 103920092 | | 7/2014 |
| JP | 58-011581 A1 | | 1/1983 |
| JP | 2001089757 A1 | | 4/2001 |
| JP | 2001170099 A1 | | 6/2001 |
| JP | 2002-60741 | | 2/2002 |
| JP | 2004-65949 | | 3/2004 |
| JP | 2006247233 A1 | | 9/2006 |
| JP | 2008-214535 A1 | | 9/2008 |
| JP | 2011-212170 | | 10/2011 |
| JP | 4981960 | | 7/2012 |
| JP | 5073035 B2 | * | 11/2012 |
| JP | 2013-9747 | | 1/2013 |
| JP | 2013-183932 A1 | | 12/2013 |
| TW | 201225943 | | 7/2012 |
| WO | 1999000078 A1 | | 1/1999 |
| WO | 2003-097764 A1 | | 11/2003 |

OTHER PUBLICATIONS

Gunasekara, Saman N., Polyols as phase change materials for low-grade excess heat storage, Energy Procedia 61 (2014) pp. 664-669 (Year: 2014).*
International Search Report for PCT/JP2015/079374, issued on Dec. 28, 2015, by Japanese Patent Office as ISA.
U.S. Appl. No. 15/733,400, filed Jul. 21, 2020, 2020/0360179, Ikezawa et al.
International Preliminary Report on Patentability received for PCT/JP2019/003587, mailed on Mar. 26, 2019, 10 pages including English translation.
Office Action received for Chinese Patent Application No. 201980011668.7, mailed on May 27, 2021, 18 pages including English translation.
EPO Communication received for European Patent Application No. 15853316.6 mailed on Aug. 14, 2018, 11 pages.
EPO Communication received for European Patent Application No. 15853316.6 mailed on Nov. 28, 2019, 6 pages.
Chinese Office Action received for Chinese Patent Application No. 201580039530.X, mailed on Mar. 28, 2019, 12 pages including English translation.
Parraffin Wax (8002-74-2), MSDS Melting, Chemical Book, 2008, 4 pages.

* cited by examiner

TEMPERATURE CONTROL AGENT, AND HEATING COMPOSITION, PACKAGING MATERIAL, AND WARMING MATERIAL EACH COMPRISING SAME

TECHNICAL FIELD

The present invention relates to a temperature control agent to be used for producing a warming material, which generates heat upon reaction with oxygen, such as a chemical body warmer or a hot pack structure, and a heat-generating composition and a packaging material each using the temperature control agent, and a warming material using any of them.

BACKGROUND ART

A warming material using a heat-generating composition that generates heat upon contact with oxygen or air is generally and widely used as medical instruments, such as a hot pack or a meridian stimulation warming tool, for relieving aches or pains by means of heat, or as daily necessities, such as a warming tool including a body warmer, for protecting against the cold.

The heat-generating composition to be used in such a warming material, most generally, contains metallic powder such as iron powder, a salt such as a dietary salt, water, a water retention agent such as activated carbon, and the like as constituent components, and generates heat by oxidation heat generation upon reaction of metal with oxygen. Therefore, conventionally, the inflow of oxygen has been controlled by air permeability, moisture permeability, the quality of materials, or the like of an air-permeable packaging material, particularly an air-permeable (porous) film, of a bag containing the heat-generating composition, in order to achieve a desired range of heat-generating properties according to the purpose of the warming material.

Among heat-generating characteristics, the characteristics that can be controlled by such a method are the maximum temperature, the temperature rising time, the duration, or the like of heat generation, and a product is designed to optimally exhibit these characteristics when the product is used under a certain condition. However, strict management of performance of the packaging material becomes a burden in terms of production costs. Moreover, when a designed ventilation volume is not achieved in the practical use due to use aspects, a pin hole of the bag, or the like even if a high-performance air-permeable packaging material is used, the performance as originally designed may not be achieved or a safety problem may occur.

For example, general disposable body warmers may vary in heating temperatures due to the changes in the environmental temperature or the amount of air to be supplied to the body warmers, which changes are caused by indoor to or from outdoor movement, wearing or taking-off of a coat, or the like. Usage of such body warmers in bed is prohibited. The reason for this is that heat dispersion is reduced when the body warmer is covered with a blanket or the like, and as a result of temperature increasing, there is a risk of low temperature burn injury. Further, disposable body warmers for use in shoes are planned to be used in an environment in which the inflow of air is limited, and thus the disposable body warmers for shoes are produced using packaging materials having relatively high air permeability. However, when the disposable body warmers for use in shoes are used in a practical manner, the amount of air to be supplied varies for each type of shoes so that a variation in temperature may occur or temperature may rapidly increase upon taking shoes off.

In addition, similar problems also arise in warming materials for medical use that require more accurate temperature control. For example, percutaneous absorption-type medical hot packs having a combination of a heating element and a medicine are known to have merits, such as an increase in effect and a decrease in medicine amount by increased efficiency of percutaneous absorption by heat. However, as described above, since stability in heating temperature is not perfectly achieved by the conventional temperature control art, there is a problem in that temperature is not stable in practice so that the administered amount of the medicine is not stable. Further, as a substitute for moxa cautery using no fire, there is a need for a heating element for short-time use; however, the moxa cautery uses heat of a high temperature zone, and the risk of applying the disposable body warmer technique that lacks temperature stability is large and thus such a heating element has not been widely used.

CITATION LIST

Patent Documents

Patent Document 1: International Publication WO 1999/000078 A
Patent Document 2: Japanese Provisional Patent Publication JP 2001-170099 A

SUMMARY OF THE INVENTION

Problem to be Solved by the Invention

An object of the invention is to provide a means for realizing simple temperature control of a warming material in lower cost that can be used instead of or along with conventional temperature control which controls an amount of supplied oxygen or air by an air-permeable film or the like, and to provide a warming material using the same. In addition, another object of the invention is to provide a more accurate temperature control means that can be used for a warming material for medical use, and to provide a warming material for medical use that achieves further improvement in safety and effectiveness.

Means for Solving Problem

According to the invention, there are provided the following items:

(1) a temperature control agent for controlling a heat generation temperature of a warming material containing a heat-generating composition that generates heat upon reaction with oxygen, the temperature control agent containing one or more aliphatic compounds having a melting point of 35° C. to 65° C. and a water solubility (g/100 mL) at 20° C. of 5 or less;

(2) the temperature control agent according to the item (1), in which the temperature control agent contains one or more compounds selected from the group consisting of a higher α-olefin polymer, paraffin wax, myristyl myristate, polyester polyol, and polyoxyethylene fatty acid diester;

(3) a heat-generating composition that contains metallic powder, a salt, water, and activated carbon and generates heat upon reaction with oxygen, the heat-generating composition further containing the temperature control agent according to the item (1) or (2);

(4) a warming material comprising a bag, wherein the bag contains the heat-generating composition according to the item (3) and has air permeability in at least a part thereof;

(5) the warming material according to the item (4), further comprising a means for fixing the bag to an object to be heated;

(6) the warming material according to the item (4) or (5), in which at least the bag is contained in an airtight outer bag that substantially blocks oxygen;

(7) the warming material according to any one of the items (4) to (6), for use as a disposable body warmer or a medical instrument;

(8) the warming material according to the item (7), in which the medical instrument is a hot pack or a meridian stimulation warming tool;

(9) an air-permeable packaging material for forming a bag that contains a heat-generating composition that generates heat upon reaction with oxygen, the air-permeable packaging material comprising a layer containing the temperature control agent according to the item (1) or (2);

(10) the air-permeable packaging material according to the item (9), in which the layer containing the temperature control agent is provided between an air-permeable film or sheet layer and a non-woven fabric layer or on an air-permeable film or sheet;

(11) a warming material comprising a bag that contains a heat-generating composition containing metallic powder, a salt, water, and activated carbon and generating heat upon reaction with oxygen, in which at least a part of the bag is configured by the air-permeable packaging material according to the item (9) or (10);

(12) the warming material according to the item (11), comprising a means for fixing the bag to an object to be heated;

(13) the warming material according to the item (11) or (12), in which at least the bag is contained in an airtight outer bag that substantially blocks oxygen;

(14) the warming material according to any one of the items (11) to (13), for use as a disposable body warmer or a medical instrument;

(15) the warming material according to the item (14), in which the medical instrument is a hot pack or a meridian stimulation warming tool;

(16) the heat-generating composition according to the item (3), in which the heat-generating composition is in a solid form;

(17) a warming material comprising the heat-generating composition according to the item (16); and

(18) the warming material according to the item (17), which is a meridian stimulation warming tool.

Effect of the Invention

According to the invention, a simple, low-cost, and satisfactory temperature control means which can be used instead of or in addition to temperature control by an air-permeable film in a warming material is provided, and thus a warming material with further excellent temperature stability and high safety can be realized. In particular, the invention provides a warming material that has a low risk of low temperature burn injury, for example, even when the warming material is used during sleeping. Specifically, for example, the invention provides the following items:

a warming material that has a reduced risk of low temperature burn injury caused by covering with a blanket and that can be safely used even while in bed;

a disposable body warmer for use in shoes that can stably generate heat regardless of the type of shoes, does not cause rapid temperature increasing even when the shoes are taken off, and has high safety;

a percutaneous absorption-type medical hot pack that has a high degree of temperature stability, and high safety and effectivity; and a warming material used as a meridian stimulation warming tool, such as moxa cautery, that can be safely used by controlling a maximum temperature even in a high temperature zone.

MODE(S) FOR CARRYING OUT THE INVENTION

Temperature Control Agent

Figure 1:
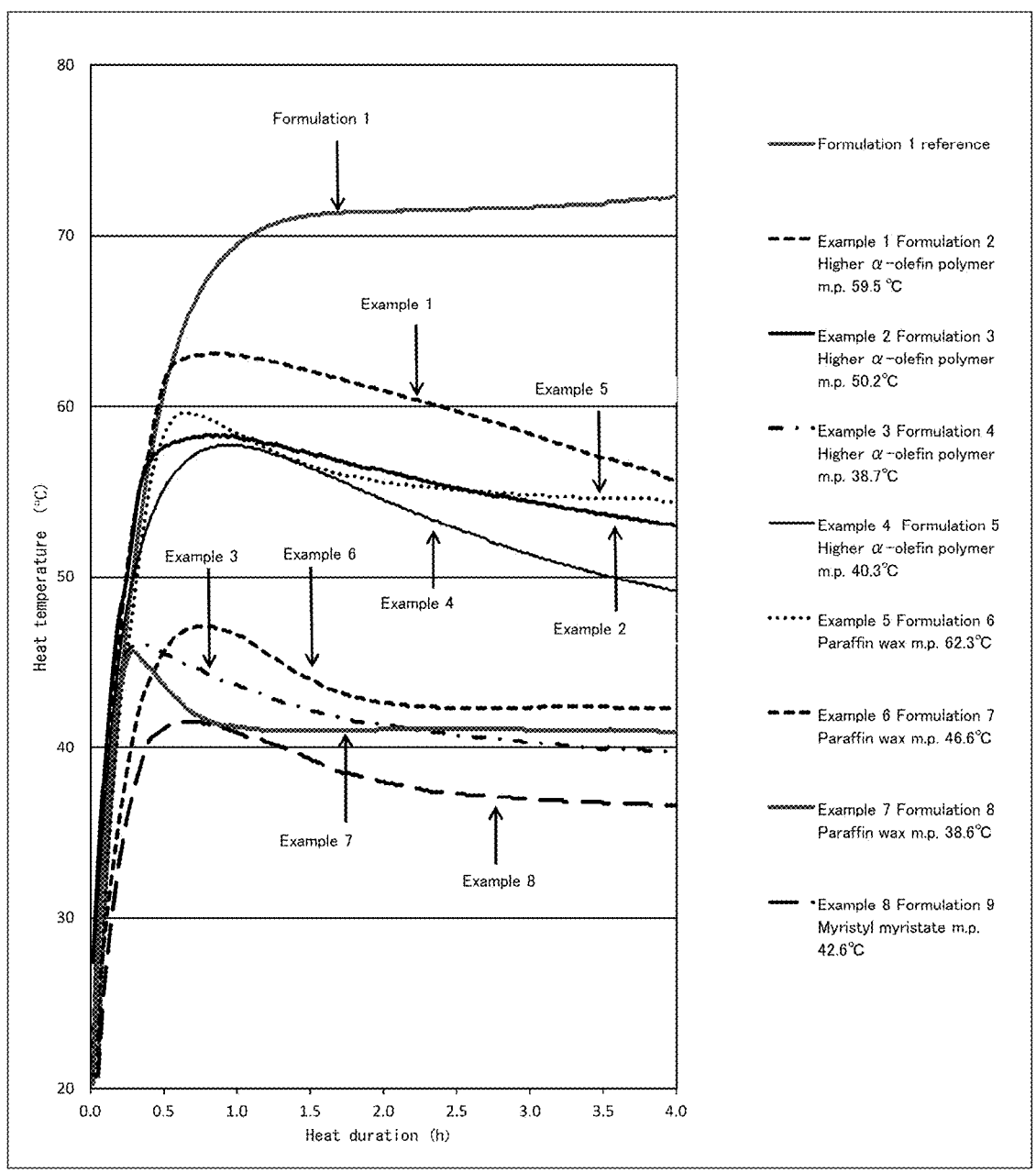
FIG. 1 is a diagram showing heat generation patterns of warming materials charged with the heat-generating compositions of Examples 1 to 8.

A temperature control agent of the invention is characterized by containing an aliphatic compound having a melting point of 35° C. to 65° C. and a water solubility (g/100 mL) at 20° C. of 5 or less. The solubility is preferably 3 or less and more preferably 1 or less. A preferable melting point varies depending on the usage of a warming material, but in general, it is preferably 38° C. to 60° C.

An aliphatic compound having such properties can be selected from higher α-olefin polymers, various paraffin waxes such as those plant-derived, animal-derived, or petroleum-derived, myristyl myristate, polyester polyol, and polyoxyethylene fatty acid diester, and the like. In the present specification, a higher α-olefin polymer indicates a polymer obtained by copolymerization of two or more kinds of α-olefin having 10 to 35 carbon atoms or copolymerization of one or more kinds of α-olefin having 10 to 35 carbon atoms with one or more kinds of other olefins.

The higher α-olefin polymer to be used in the invention may be a main-chain crystallizable polyolefin whose main chain is fold to be crystalized, but it is preferably a side-chain crystallizable polyolefin having a certain long-chain α-olefin at the side chain. A side-chain crystallizable polyolefin has sharp melting behavior. When the side-chain crystallizable polyolefin is not melted, there is no stickiness, which is favorable. Such a side-chain crystallizable polyolefin is manufactured and sold, for example, as "HS Crysta" (Hokoku Corporation; product name) or the like, and is commercially available. Similarly, paraffin wax (for example, Nippon Seiro Co., Ltd.), myristyl myristate (for example, Croda Japan KK), polyester polyol (for example, DIC Corporation or Hokoku Corporation), polyoxyethylene fatty acid diester (for example, Sanyo Chemical Industries, Ltd.), a higher α-olefin polymer (for example, TOYO ADL CORPORATION) are also commercially available.

The measurement of the melting point is performed using a differential scanning calorimeter as follows. To an aluminum (Al) container, 5 mg to 15 mg of a sample is input, and covered with a crimp cover made of Al, and then a certain pressure is applied to seal the container. The temperature is increased at a temperature increasing rate of 5° C./min from −50° C. of an estimated melting point to +30° C. of the estimated melting point while using the Al container+the clamp cover as a reference. After the temperature is held for 5 minutes, the temperature is decreased at the same rate and then is held at −50° C. of the estimated melting point for 5 minutes. This operation is repeated twice, and the DSC curve at the second cycle (2nd-run) is measured. The melting point is read from the main endothermic peak appearing in the DSC curve by the endotherm associated with the melting of the sample.

The water solubility at 20° C. can be measured by dissolving a sample in 100 g (100 ml) of water at 20° C. and then reading the mass of the limit amount at which the sample is no longer dissolved (the maximum amount of the dissolved sample).

The aliphatic compound contained in the temperature control agent of the invention can be present in the form of a pellet, powder, a block, or the like at normal temperature. From the viewpoint of convenience in mixing with the heat-generating composition, an aliphatic compound in a powder form at normal temperature is advantageous. An aliphatic compound in the form of a pellet, a block, or the like can be uniformly mixed by subjecting the aliphatic compound to pulverization (for example, freeze-pulverization) before mixing to form powder. The temperature control agent of the invention may contain one or more aliphatic compounds as described above, and further, may optionally contain a lipophilic adsorbent, a clathrate compound (for example, cyclodextrin), a sustained preparation, a plasticizer, or the like for the purpose of improving physical properties. As an example, in a case where the temperature control agent of the invention is applied to a packaging material and used, addition of a plasticizer for improving coating and spinning properties or a hot-melt adhesive is mentioned as an auxiliary agent for improving coating performance.

The mechanism by which stability of the heat-generating properties is achieved by using the temperature control agent of the invention is not limited to a specific theory, but is basically considered as follows. In the case of adding the temperature control agent to the heat-generating composition, the temperature control agent is melted when the heat-generating temperature reaches a temperature near the melting point of the temperature control agent so that the periphery of iron powder is covered with the melted temperature control agent. Accordingly, oxidation reaction is inhibited, and thus temperature increasing is suppressed. Further, in the case of adding the temperature control agent to a layer of the air-permeable packaging material, the temperature control agent is melted when the heat-generating temperature reaches a temperature near the melting point of the temperature control agent so that pores or needle holes and so on of a porous film is blocked with the melted temperature control agent. As a result, the amount of permeated oxygen to the heat-generating composition is decreased, and thus temperature increasing is suppressed.

Incidentally, the maximum temperature and the heat generation pattern to be achieved vary depending on the usage of the warming material. Therefore, the type and the content of the temperature control agent are selected such that demanded heat generation performance is achieved.

For example, a hot pack body warmer which is directly attached to the skin preferably generates heat at a heat generation temperature near 40° C., but it is said that at a temperature above 43° C., denaturation of protein may occur and thus the risk of low temperature burn injury increases. For this reason, the heat generation temperature of the hot pack body warmer is designed not to exceed 43° C., and in a case where there is a possibility that the heat generation temperature becomes 43° C. or higher, it is necessary to rapidly suppress temperature increasing to near 40° C. which is a preferable heat generation temperature. On the other hand, a continuous decrease in temperature after such suppression is not desirable in terms that warming effect is decreased. Further, even in the case of a hot pack body warmer which is directly attached to the skin, when the hot pack body warmer is attached to a woman's delicate abdominal part in order to alleviate menstrual cramps, mild heat generation of 40° C. or lower is preferable.

Meanwhile, a disposable body warmer which is attached to clothes is used at a temperature near a maximum temperature of 55° C. since the skin is protected by clothes, but it is necessary to design the disposable body warmer not to exceed 63° C. that is a maximum temperature described in the indication of the product. In the case of a disposable body warmer as a substitute for moxa cautery, the disposable body warmer is used at a relatively high temperature and in a short time, but it is necessary to design the disposable body warmer not to exceed a temperature near 55° C. since the disposable body warmer is in direct contact with the skin. Further, in the case of the substitute for moxa cautery, it is desirable to rapidly decrease temperature after the suppression of temperature increasing.

As described above, since there are the maximum temperature and the heat generation pattern suitable for each of various warming materials, in order to realize these, it is possible to design a temperature control agent, by appropriately selecting one or more aliphatic compounds having a melting point near a desired maximum temperature (for example, a melting point of about −20° C. to about 10° C. of the maximum temperature (that is, the maximum temperature is within about +20° C. to −10° C. of the melting point), preferably a melting point having a difference between the maximum temperature and the melting point within about ±8° C., and more preferably a melting point having a difference between the maximum temperature and the melting point within about ±5° C.), as well as the added amount, addition method, addition of an arbitrary component, and the like. For example, in order to control the maximum temperature to about 60° C., a paraffin wax having a melting point of 62° C. can be selected.

Heat-Generating Composition

The heat-generating composition of the invention contains at least metallic powder, a salt, water and activated carbon, and further contains the temperature control agent of the invention. The temperature control agent is as described above.

As the metallic powder, iron powder is generally used, but any metallic powder other than iron powder may be used as long as it generates oxidation heat. As a salt, inorganic salts such as sodium chloride, potassium chloride, and magnesium chloride are generally used. The heat-generating composition of the invention contains activated carbon and may further contain a water retention agent other than activated carbon (for example, a water absorptive polymer, vermiculite, sawdust, or a silica material). Further, as necessary, conventionally known various other components can be added.

Formulation examples of blending these components include, for example, when the weight of the heat-generating composition is regarded as 100%, a heat-generating composition comprising from 35 to 80% by weight of iron, 1 to 20% by weight of activated carbon, 1 to 10% by weight of salt, 5 to 45% by weight of water, and 0 to 45% by weight of water retention agent other than activated carbon. In the heat-generating composition of the invention, it is preferable that iron be contained in a range of 45 to 70% by weight, activated carbon be contained in a range of 1 to 15% by weight, a salt be contained in a range of 2 to 5% by weight, water be contained in a range of 20 to 30% by weight, and a water retention agent other than activated carbon be contained in a range of 1 to 10% by weight. The amount of the temperature control agent blended can be appropriately selected depending on the usage purpose of the warming material, the maximum temperature to be achieved, and the like as described above. For example, with respect of 100 parts by weight of the heat-generating composition having such formulation, 3 to 40 parts by weight, preferably, 3 to 30 parts by weight of the temperature control agent of the invention is added and mixed.

A heat-generating composition can be produced by mixing indispensable components as described above and an arbitrary component(s) selected as necessary under a low oxygen condition or an anoxic condition by a known method. The heat-generating composition may be powder, which may be further processed by a known method. For example, it may be formed into shapes, such as a sheet shape by rolling, a cube shape by tableting, or the like. In the case of forming the heat-generating composition in a solid form, a binder such as cellulose (for example, crystalline cellulose), lactose, starch, dextrin, sucrose ester, Teflon (registered trademark), polyethylene glycol, or carboxymethyl cellulose may be added. For example, in order to subject the heat-generating composition to tablet molding to form a tablet-type solid, 10 parts by weight or more, preferably, 10 to 30 parts by weight of a binder such as crystalline cellulose with respect to 100 parts by weight of the heat-generating composition is added so that a tablet having a desired and suitable hardness can be obtained. Such a solid-form heat-generating composition is favorable because it prevents a failure in sealing caused by attachment of powder to a sealing portion of a bag or container at the time of packing, and eliminates a variation in heat generation temperature. Incidentally, regarding the heat-generating composition, a salt may be added at the same time when powder raw materials are mixed or may be added as salt water.

The heat-generating composition of the invention containing a temperature control agent as described above can be checked as to whether a desired maximum temperature can be achieved, by temporally measuring, according to a heat generation test of JIS S4100, a change in temperature when the heat-generating composition is reacted with oxygen in air via an air-permeable packaging material (for example, 17,000 to 18,000 sec/100 cc (JIS P8117 method (Gurley method)) used as a bag for containing the heat-generating composition. Incidentally, the heat generation test performed for this purpose may be performed while test conditions are appropriately modified such that an assumed situation of actual use is reflected.

Packaging Material

Figure 11A:
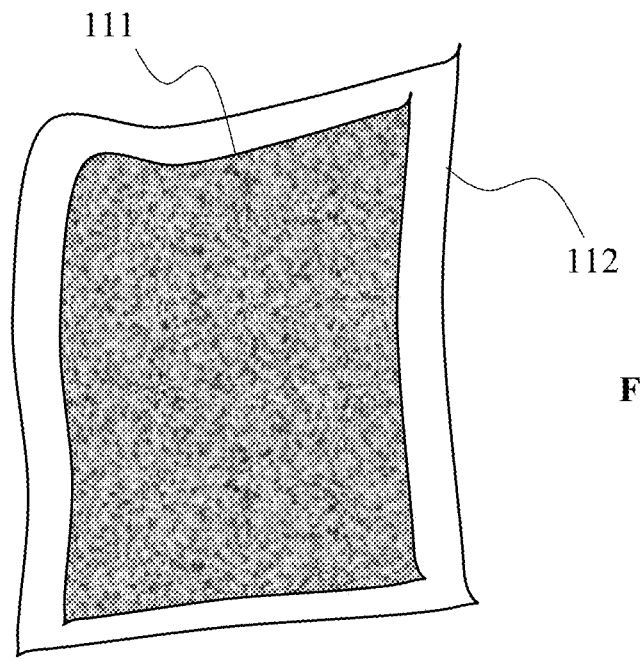
FIG. 11(A) shows a diagram illustrating a warming pack (a warmer) comprising a bag that contains a heat generating composition in accordance with one embodiment of the invention.

Referring to FIG. 11(A), the heat-generating composition 111 is charged in the bag 112 for containing a heat-generating composition. The bag charged with the heat-generating composition can be used per se as a warming material (for example, a so-called non-stick-type body warmer) without any change. In general, the bag for containing a heat-generating composition is formed such that at least a part of the bag has air permeability.

The air-permeable packaging material configuring the bag for containing a heat-generating composition can be appropriately selected from known materials so as to be in a desired range according to the usage purpose, since the heat-generating properties of a heat-generating material (rising speed of heat generation, heat generation retention time, thermal conductivity to a target to be heated such as a human body or clothes, and the like) vary depending on the selection of the air-permeable packaging material.

An air-permeable packaging material of 10,000 to 40,000 sec/100 cc (JIS P8117) is used in a general body warmer for a human body, and the like. Further, for example, an air-permeable packaging material of 2,000 to 7,000 sec/100 cc is used in a body warmer for use in shoes. Accordingly, as an air-permeable packaging material of a bag for containing a heat-generating composition, generally, a packaging material having an air permeability degree of 2,000 to 40,000 sec/100 cc is used. In the case of a warming material, which is designed to be used at high temperature and/or in a short time, such as a meridian stimulation warming tool, a packaging material of 0 to 10,000 sec/100 cc can be used. By using the temperature control agent of the invention, precise management for air permeability degree is not necessary depending on the use of the warming material, and thus the acceptable range of usable air-permeable packaging materials is widened.

As an air-permeable packaging material used for the bag in the invention, a film or sheet entirely or partially having air permeability may be used. In general, a single-layered or laminated porous film or sheet may be used alone or in combination with a woven fabric or non-woven fabric. Alternatively, a single-layered or laminated non-porous film or sheet, alone or in combination with a woven fabric or non-woven fabric etc., may be provided with needle holes and used. Incidentally, in the invention, a "film" mainly indicates a single product (including a single-layered or laminated product; the same applies in the following) or a relatively thin product and a "sheet" mainly indicates a single product, a laminate of two or more single products, or a relatively thick product; however, they are not strictly distinguished.

As a resin constituting a film, generally, a thermoplastic synthetic resin or the like is used. Specifically, polyethylene, polypropylene, polyester, polyamide, polyvinyl alcohol, polyvinyl chloride, polyvinylidene chloride, polyurethane, polystyrene, an ethylene-vinyl acetate copolymer, polycarbonate, or the like is preferably used either alone or in combination. Depending on the purpose, a resin can be appropriately selected according to appropriate necessary heat generation amount, temperature, a heat-generating composition to be used, or the like.

In the invention, as an air-permeable film or sheet, a stretched film, preferably, a stretched porous film or a sheet comprising the same is suitably used. The stretched porous film generally contains an inorganic filler and has communication holes formed by stretching so that air permeability is exhibited, and the air permeability degree can be controlled by controlling this hole diameter or the like.

In the case of performing lamination, generally, lamination is performed by a laminating method but is not limited thereto. Any conventionally known method can be employed in lamination. For example, lamination may be performed by a method using thermal bonding, or by means of an adhesive such as a hot-melt adhesive or an acrylic or urethane adhesive. The surfaces may be completely bonded, or may be partially bonded in order to maintain flexibility. A curtain spray method or dry lamination method is preferably used.

A non-woven fabric is used in the air-permeable packaging material from the viewpoint of reinforcing the packaging material strength, improving mechanical adequacy, and the like. As a non-woven fabric which may be laminated with the above-described film, conventionally, a product used in the technical field of a heating element, a medical heating tool, or the like is suitably used. Examples of the non-woven fabric include non-woven fabrics containing synthetic fibers such as nylon, vinylon, polyester, rayon, acetate, acrylic, polyethylene, polypropylene, and polyvinyl chloride; and non-woven fabrics containing natural fibers such as cotton, hemp, and silk. Non-woven fabrics in the form of spunbond, thermal bond, spunlace, or the like are mentioned. The weight of the non-woven fabric varies depending on the specific weight of the non-woven fabric material or the bulk height by a difference in interlacing method, but generally, the weight is suitably about 10 $g/m^2$ to about 200 $g/m^2$ and particularly preferably about 20 $g/m^2$ to about 100 $g/m^2$.

In particular, an air permeable sheet which is obtained by laminating a non-woven fabric of nylon fibers, polyester fibers, or the like with a stretched porous film of a thermoplastic synthetic resin is generally and widely used.

As a method of forming a layer containing the temperature control agent of the invention in the air-permeable packaging material, any of methods such as a curtain spray method and a dry lamination method is used. For example, in the curtain spray method, two application guns are used in one process, a temperature control agent (preferably containing an auxiliary agent for improving coating performance) is applied to a non-woven fabric or a porous film by a first application gun, and a hot-melt adhesive used for adhesion is applied to a non-woven fabric or a porous film by a second application gun so as to be pasted to each other, thereby obtaining a packaging material in which the non-woven fabric and the porous film are laminated. Similarly, also in the dry lamination method, two gravure rolls are used in one process, a temperature control agent diluted with an organic solvent is applied to a non-woven fabric or a porous film by a first gravure roll, a solvent-based adhesive used for adhesion is applied to a non-woven fabric or a porous film by a second gravure roll so as to be pasted to each other, thereby obtaining a packaging material in which the non-woven fabric and the porous film are laminated. Further, a packaging material having a temperature control agent layer on a film surface may be produced without using a non-woven fabric by applying the temperature control agent to an air-permeable film, for example, to a porous film single body so as to be coated on the porous film. Such a packaging material per se may be used in production of a disposable body warmer without any change or may be laminated with a non-woven fabric in the subsequent process.

A part of the bag, for example, a packaging material at a rear side of a flat bag may be an air-permeable packaging material as described above or may be an air-impermeable packaging material. The air-impermeable packaging material can be formed in a single layer or a laminated film or sheet of a resin as described above, and there is no particular limitation on the material, thickness, configuration, and the like as long as the air-impermeable packaging material is suitable for the production of the bag for containing a heat-generating composition.

The bag for containing a heat-generating composition can be produced using the packaging material as described above by attaching periphery portions to each other by a method generally used in the technical field. The warming material can be basically produced by packing the heat-generating composition of the invention in the bag. In general, the production of the bag and the production of the heat-generating material are continued. First, the periphery portions of the layered packaging materials are attached to each other by heat sealing or a pressure-sensitive adhesive while a part of the periphery portions is left open, the heat-generating composition is dispensed into the bag from the opening portion, and then the opening portion is also adhered. Accordingly, the heat-generating composition is sealed.

Further, a product having a small application area and/or a short use time such as a moxibustion tool may be contained, for example, in a container having a thickness of about several mm to several cm, instead of the flat bag, and used. Also, in this case, packaging materials of various properties as described above can be appropriately used in production of a lid (a top member) and a container body. Incidentally, as described above, in the case of a product using high-temperature and/or short-time heat generation such as a moxibustion tool, a packaging material having extremely high air permeability can be used and thus a non-woven fabric may be used alone.

Warming Material

The warming material can be configured by only a bag (for example, a non-stick-type disposable body warmer) or container (for example, a moxibustion tool) that is charged with the heat-generating composition of the invention as described above, and as necessary, additional elements can be further added. These various elements are known and may be integrated with the bag or may be provided as a separate member to be assembled at the time of use. As examples of the additional elements, there are mentioned various means for fixing the bag or container and various parts to be assembled with the bag or container at the time of use (for example, parts to be used according to the usage of the warming material such as a container containing a perfume or a medicine and a sheet containing water or a cosmetic material). As the fixing means, for example, there are mentioned a pressure-sensitive adhesive layer or wet pack layer, which is formed on the surface of a part of a bag or container for containing a heat-generating composition, enabling the warming material to be pasted thereto, a band-shaped member used for fixation by winding the member on an object to be heated, a mask, supporter, or wrist band, which is provided with a pocket for containing a heat-generating material, and the like. Further, for the purpose of temperature control or the like, a seat may be provided between a container and a pressure-sensitive adhesive layer so as to control a distance and/or space between an application part and the warming material. Incidentally, regarding the warming material of the invention, various agents such as camphor and menthol, or a perfume may be used in combination with a constituent element such as a pressure-sensitive adhesive layer or a wet pack layer, or a heat-generating composition, and/or a packaging material or a container. For example, as a heat-sensing receptor, capsicum tincture, capsicum extract, powdered capsicum, ginger tincture, ginger extract, powdered ginger, fennel tincture, fennel extract, powdered fennel, capsaicin, capsaicin derivative, vanillyl butyl ether, vanillyl alkyl ether, nonylic acid vanillylamide, or the like can be added to the pressure-sensitive adhesive. As a cold-sensing receptor, l-menthol, *Mentha arvensis*, dl-camphor, peppermint oil, thymol, menthyl ethylamido oxalate, or the like can be added to the pressure-sensitive adhesive.

Figure 11B:
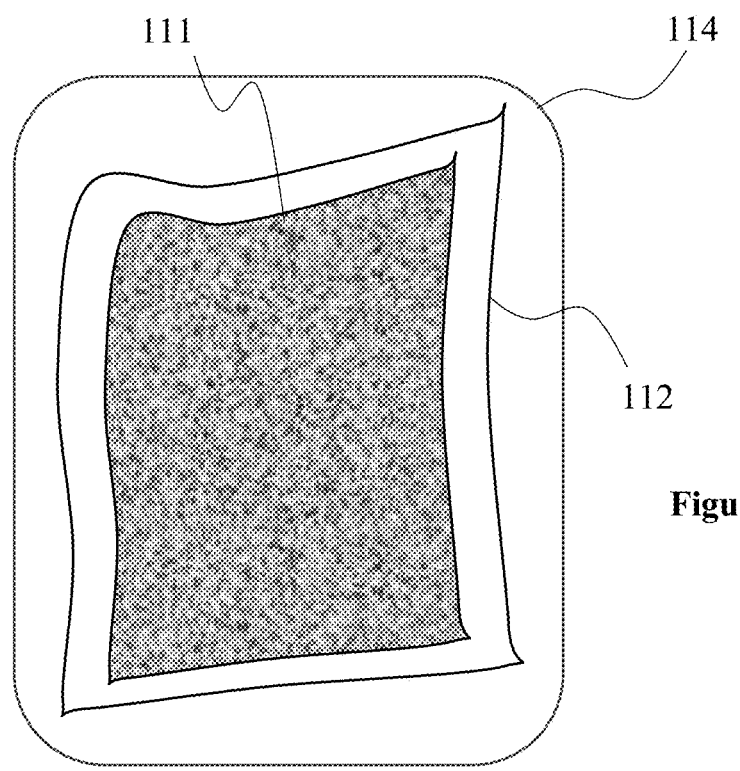
FIG. 11(B) shows a diagram illustrating a warming product comprising the warming pack warmer) of FIG. 11(A) disposed inside an airtight outer bag.

Referring to FIG. 11(B), the bag 112, which contains the heat-generating composition 111, of the warming material is sealed in an outer bag 114 that blocks oxygen and then maintained until the use thereof. Such an outer bag is also known.

EXAMPLES

Examples 1 to 16

A heat-generating composition with basic formulation was produced by using, as materials of the heat-generating composition, iron powder (model number: RDH-3M, Powdertech Co., Ltd.), activated carbon (model number: FY-1, CATALER CORPORATION), vermiculite (Vermitech Corporation), a water absorptive polymer (model number: ST-500D, Sanyo Chemical Industries, Ltd.), a refined salt (ordinary salt, Nihonkaisui Co., Ltd.), and water.

Heat-generating compositions were produced by using various aliphatic compounds presented in Table 1, warming materials (disposable body warmers) were produced by using these heat-generating compositions, and heat-generating properties thereof were tested. The compositions of the heat-generating compositions are as presented in Table 2. (In the table, the unit of content is "part(s) by weight.")

TABLE 1

| | Aliphatic compound | Manufacturer name | Model number | Property |
|---|---|---|---|---|
| Example 1 | Higher α-olefin polymer | Hokoku Corporation | HS Crysta 6100 | Pellet |
| Example 2 | Higher α-olefin polymer | Hokoku Corporation | HS Crysta 5100 | Pellet |
| Examples 3 and 18 | Higher α-olefin polymer | Hokoku Corporation | HS Crysta 4100P | Powder |
| Example 4 | Higher α-olefin polymer | TOYO ADL CORPORATION | VYBAR260 | Pellet |
| Examples 5 and 17 | Paraffin wax | NIPPON SEIRO CO., LTD. | SP-0145 | Powder |
| Example 6 | Paraffin wax | NIPPON SEIRO CO., LTD. | Praffin Wax-115 | Block |
| Example 7 | Paraffin wax | NIPPON SEIRO CO., LTD. | Hi-Mic-1045 | Block |
| Example 8 | Myristyl myristate | Croda Japan KK | SR CRODAMOL MM-SO-(JP) | Pellet |
| Example 9 | Polyester polyol | DIC Corporation | Polylite OD-X-2547 | Block |
| Example 10 | Polyester polyol | Hokoku Corporation | HS2H-201AP | Block |
| Example 11 | Polyester polyol | Hokoku Corporation | HS-2P-103S | Block |
| Example 12 | Polyester polyol | DIC Corporation | Polylite OD-X-668 | Block |
| Example 13 | Polyester polyol | DIC Corporation | Polylite OD-X-240 | Block |
| Example 14 | Polyester polyol | Hokoku Corporation | HOKOKUOL HT-110 | Block |
| Example 15 | Polyester polyol | Hokoku Corporation | HOKOKUOL HT-12 | Block |
| Example 16 | Polyoxyethylene fatty acid diester | Sanyo Chemical Industries, Ltd. | IONET DS-400 | Block |

TABLE 1-continued

|  | Aliphatic compound | Manufacturer name | Model number | Property |
|---|---|---|---|---|
| Comparative Example 1 | Polyethylene glycol | Sanyo Chemical Industries, Ltd. | PEG20000P | Powder |
| Comparative Example 2 | Polyethylene glycol | Sanyo Chemical Industries, Ltd. | PEG6000P | Powder |
| Comparative Example 3 | Polyoxyethylene polyoxypropylene block polymer | Sanyo Chemical Industries, Ltd. | NEWPOL PE-68 | Scale |
| Comparative Example 4 | Terpene resin | YASUHARA CHEMICAL CO., LTD. | PX800 | Block |

TABLE 2

| Material | Ref. Formulation 1 | Example 1 F. 2 | 2 F. 3 | 3 F. 4 | 4 F. 5 | 5 F. 6 | 6 F. 7 | 7 F. 8 | 8 F. 9 | 9 F. 10 | 10 F. 11 |
|---|---|---|---|---|---|---|---|---|---|---|---|
| Iron Powder | 58.7 | 58.7 | 58.7 | 58.7 | 58.7 | 58.7 | 58.7 | 58.7 | 58.7 | 58.7 | 58.7 |
| Act. carbon | 6.2 | 6.2 | 6.2 | 6.2 | 6.2 | 6.2 | 6.2 | 6.2 | 6.2 | 6.2 | 6.2 |
| Vermiculite | 5.2 | 5.2 | 5.2 | 5.2 | 5.2 | 5.2 | 5.2 | 5.2 | 5.2 | 5.2 | 5.2 |
| Water abs. polymer | 2.6 | 2.6 | 2.6 | 2.6 | 2.6 | 2.6 | 2.6 | 2.6 | 2.6 | 2.6 | 2.6 |
| Refined salt | 3.6 | 3.6 | 3.6 | 3.6 | 3.6 | 3.6 | 3.6 | 3.6 | 3.6 | 3.6 | 3.6 |
| Water | 23.7 | 23.7 | 23.7 | 23.7 | 23.7 | 23.7 | 23.7 | 23.7 | 23.7 | 23.7 | 23.7 |
| Example 1 |  | 10.0 |  |  |  |  |  |  |  |  |  |
| Example 2 |  |  | 10.0 |  |  |  |  |  |  |  |  |
| Example 3 |  |  |  | 10.0 |  |  |  |  |  |  |  |
| Example 4 |  |  |  |  | 10.0 |  |  |  |  |  |  |
| Example 5 |  |  |  |  |  | 10.0 |  |  |  |  |  |
| Example 6 |  |  |  |  |  |  | 10.0 |  |  |  |  |
| Example 7 |  |  |  |  |  |  |  | 10.0 |  |  |  |
| Example 8 |  |  |  |  |  |  |  |  | 10.0 |  |  |
| Example 9 |  |  |  |  |  |  |  |  |  | 10.0 |  |
| Ex 10 |  |  |  |  |  |  |  |  |  |  | 10.0 |
| Ex 11 |  |  |  |  |  |  |  |  |  |  |  |
| Ex 12 |  |  |  |  |  |  |  |  |  |  |  |
| Ex 13 |  |  |  |  |  |  |  |  |  |  |  |
| Ex 14 |  |  |  |  |  |  |  |  |  |  |  |
| Ex 15 |  |  |  |  |  |  |  |  |  |  |  |
| Ex 16 |  |  |  |  |  |  |  |  |  |  |  |
| Comp. ex 1 |  |  |  |  |  |  |  |  |  |  |  |
| Comp. ex 2 |  |  |  |  |  |  |  |  |  |  |  |
| Comp. ex 3 |  |  |  |  |  |  |  |  |  |  |  |
| Comp. ex 4 |  |  |  |  |  |  |  |  |  |  |  |
|  | 100.0 | 110.0 | 110.0 | 110.0 | 110.0 | 110.0 | 110.0 | 110.0 | 110.0 | 110.0 | 110.0 |

| Material | Example 11 F. 12 | 12 F. 13 | 13 F. 14 | 14 F. 15 | 15 F. 16 | 16 F. 17 | Comparative example 1 F. 18 | 2 F. 19 | 3 F. 20 | 4 F. 21 |
|---|---|---|---|---|---|---|---|---|---|---|
| Iron Powder | 58.7 | 58.7 | 58.7 | 58.7 | 58.7 | 58.7 | 58.7 | 58.7 | 58.7 | 58.7 |
| Act. carbon | 6.2 | 6.2 | 6.2 | 6.2 | 6.2 | 6.2 | 6.2 | 6.2 | 6.2 | 6.2 |
| Vermiculite | 5.2 | 5.2 | 5.2 | 5.2 | 5.2 | 5.2 | 5.2 | 5.2 | 5.2 | 5.2 |
| Water abs. polymer | 2.6 | 2.6 | 2.6 | 2.6 | 2.6 | 2.6 | 2.6 | 2.6 | 2.6 | 2.6 |
| Refined salt | 3.6 | 3.6 | 3.6 | 3.6 | 3.6 | 3.6 | 3.6 | 3.6 | 3.6 | 3.6 |
| Water | 23.7 | 23.7 | 23.7 | 23.7 | 23.7 | 23.7 | 23.7 | 23.7 | 23.7 | 23.7 |
| Example 1 |  |  |  |  |  |  |  |  |  |  |
| Example 2 |  |  |  |  |  |  |  |  |  |  |
| Example 3 |  |  |  |  |  |  |  |  |  |  |
| Example 4 |  |  |  |  |  |  |  |  |  |  |
| Example 5 |  |  |  |  |  |  |  |  |  |  |
| Example 6 |  |  |  |  |  |  |  |  |  |  |
| Example 7 |  |  |  |  |  |  |  |  |  |  |
| Example 8 |  |  |  |  |  |  |  |  |  |  |
| Example 9 |  |  |  |  |  |  |  |  |  |  |
| Ex 10 |  |  |  |  |  |  |  |  |  |  |
| Ex 11 | 10.0 |  |  |  |  |  |  |  |  |  |
| Ex 12 |  | 10.0 |  |  |  |  |  |  |  |  |

TABLE 2-continued

| | 1 | 2 | 3 | 4 | 5 | 6 | 7 | 8 | 9 | 10 |
|---|---|---|---|---|---|---|---|---|---|---|
| Ex 13 | | 10.0 | | | | | | | | |
| Ex 14 | | | 10.0 | | | | | | | |
| Ex 15 | | | | 10.0 | | | | | | |
| Ex 16 | | | | | 10.0 | | | | | |
| Comp. ex 1 | | | | | | 10.0 | | | | |
| Comp. ex 2 | | | | | | | 10.0 | | | |
| Comp. ex 3 | | | | | | | | 10.0 | | |
| Comp. ex 4 | | | | | | | | | | 10.0 |
| | 110.0 | 110.0 | 110.0 | 110.0 | 110.0 | 110.0 | 110.0 | 110.0 | 110.0 | 110.0 |

(Units: Parts by wt)

Regarding each compound presented in Table 1, pellet-shaped compounds were ground with a mortar to form powder, and block-shaped compounds were frozen for 2 hours in a freezer and then pulverized with a bamix mixing machine (manufactured by ESGE) to form powder. Each compound was mixed at a blending amount as presented in Table 2 with a conventional heat-generating composition with standard formulation ("basic formulation").

As a packaging material of the bag for containing a heat-generating composition, an air permeable sheet (air permeability degree: 9,000 sec/100 cc (JIS P8117)) produced by pasting a polyethylene terephthalate (PET) spun-lace non-woven fabric (weight: 30 g/m$^2$; manufactured by SHINWA Corporation) and a polyethylene porous film (thickness: 70μ; manufactured by KOHJIN Film & Chemicals Co., Ltd.) by a dry lamination method was used for the front side. A pressure-sensitive adhesion packaging material having a configuration of a polyethylene film (thickness: 60μ; manufactured by J-Film Corporation)/an acrylic solvent-based pressure-sensitive adhesive (manufactured by DIC Corporation)/release paper (basis weight: 40 g/m$^2$; manufactured by Sun A Kaken Co., Ltd.) was used for the rear side. Each packaging material was cut into a size of 95 mm wide×130 mm long, and the three-sides were sealed at a width of 5 mm by using an impulse sealer to form a bag. Each of the heat-generating compositions of Examples 1 to 16, which have been mixed in advance, was respectively charged at 35 g/bag in the bag, and then the remaining one side was sealed at a width of 5 mm, thereby producing disposable body warmers.

A composition with basic formulation and compositions containing compounds of comparative examples were produced in the similar way, and disposable body warmers were produced in the similar way.

The heat generation test was performed according to a method of JIS S4100 "Disposable Body Warmers" under conditions including an ambient temperature of 20±1° C., an ambient humidity of 55 to 70%, and a heating platen temperature of 30±1° C.

Examples 17 and 18

The composition with basic formulation in Table 2 was used as a heat-generating composition. A packaging material for the front side was produced as follows. A polypropylene spunbond non-woven fabric (35 g; manufactured by SHINWA Corporation) and a polyethylene porous film (thickness: 70μ; manufactured by KOHJIN Film & Chemicals Co., Ltd.) were pasted by performing coating by a hot-melt curtain spray method (10 g/m$^2$) using the temperature control agents of Examples 17 and 18 (each are the same as those of Examples 5 and 3) instead of an adhesive. The packaging material cut into a size of 95 mm wide×130 mm long was peeled off once by hands, and pasting was performed by blowing a synthetic rubber (styrene-butadiene) spray glue (manufactured by Sumitomo 3M Limited), thereby producing an air permeable sheet having an air permeability degree of 9,000 sec/100 cc (JIS P8117). The same packaging material as described above was used at the rear side. Disposable body warmers were produced in the same manner as described above and then the heat generation test was performed thereon.

<Measurement of Melting Point and Solubility>

The melting point of each aliphatic compound was measured by using a differential scanning calorimeter. As a measurement apparatus, a differential scanning calorimeter (DSC6220) connected to a fully automatic cooling unit and an analysis system (EXSTAR 6000 thermoanalytical rheology system, software: DSC Muse measurement software and DSC Muse standard analysis software) (all manufactured by Seiko Instruments Inc.) was used, and as a sample container, an open-type sample container made of Al (φ5.2 H2.5 (50 μl)) and an open-type sample container made of Al (a crimp cover) were used.

To the Al container, 5 mg to 15 mg of a sample was input, the crimp cover made of Al was covered onto, and then a certain pressure was applied to seal the container. The temperature was increased at a temperature increasing rate of 5° C./min from −50° C. of an estimated melting point to +30° C. of the estimated melting point while using the Al container+the clamp cover as a reference. After the temperature was held for 5 minutes, the temperature was decreased at the same rate and then was held at −50° C. of the estimated melting point for 5 minutes. This operation was repeated twice, and the DSC curve at the second cycle (2nd-run) was measured. The melting point was determined from the endothermic peak appearing in the DSC curve by the endotherm associated with the melting of the sample as described above.

The solubility to water was measured by dissolving powder of each aliphatic compound in 100 g (100 ml) of water at 20° C. and then reading the mass of the limit amount at which the sample is not dissolved.

The results are presented in FIGS. 1 to 4 and Table 3.

TABLE 3

| Aliphatic compound | 2nd-run m.p. peak (° C.) | Solubility to water (g/100 ml) | Warming material max. temp (° C.) | Evaluation |
|---|---|---|---|---|
| Example 1 | 59.5 | Less than 1 | 63.1 | ◎ |
| Example 2 | 50.2 | Less than 1 | 58.9 | ○ |
| Example 3 | 38.7 | Less than 1 | 45.9 | ○ |
| Example 4 | 40.3 | Less than 1 | 57.7 | ○ |
| Example 5 | 62.3 | Less than 1 | 59.6 | ◎ |
| Example 6 | 46.6 | Less than 1 | 47.1 | ◎ |
| Example 7 | 38.6 | Less than 1 | 45.2 | ○ |
| Example 8 | 42.6 | Less than 1 | 41.5 | ◎ |

TABLE 3-continued

| Aliphatic compound | 2nd-run m.p. peak (° C.) | Solubility to water (g/100 ml) | Warming material max. temp (° C.) | Evaluation |
|---|---|---|---|---|
| Example 9 | 56.1 | Less than 1 | 58.5 | ⊚ |
| Example 10 | 51.4 | Less than 1 | 59.3 | ○ |
| Example 11 | 46.5 | Less than 1 | 52.0 | ○ |
| Example 12 | 49.3 | Less than 1 | 54.4 | ○ |
| Example 13 | 35.6 | Less than 1 | 39.9 | ⊚ |
| Example 14 | 37.2 | Less than 1 | 52.6 | ○ |
| Example 15 | 31.9 | Less than 1 | 47.0 | ○ |
| Example 16 | 33.7 | Less than 1 | 47.8 | ○ |
| Example 17 | 62.3 | Less than 1 | 66.9 | ⊚ |
| Example 18 | 38.7 | Less than 1 | 45.9 | ○ |
| Comp. ex 1 | 64.7 | ≥10 | 29.8 | X |
| Comp. ex 2 | 61.4 | ≥10 | 29.8 | X |
| Comp. ex 3 | 52.1 | ≥10 | 37.8 | X |
| Comp. ex 4 | No m.p. | ≥10 | 71.6 | X |

In Table 3, the evaluation was conducted based on the following criteria: "⊚"=a case where temperature is controlled within a melting point±5.0° C.; "○"=a case where temperature is controlled in a range of +5.1° C. to +20° C. of a melting point or a case where temperature is controlled in a range of −5.1 to −10° C. of a melting point; and "x"=a case where the temperature control effect is not observed.

Figure 2:
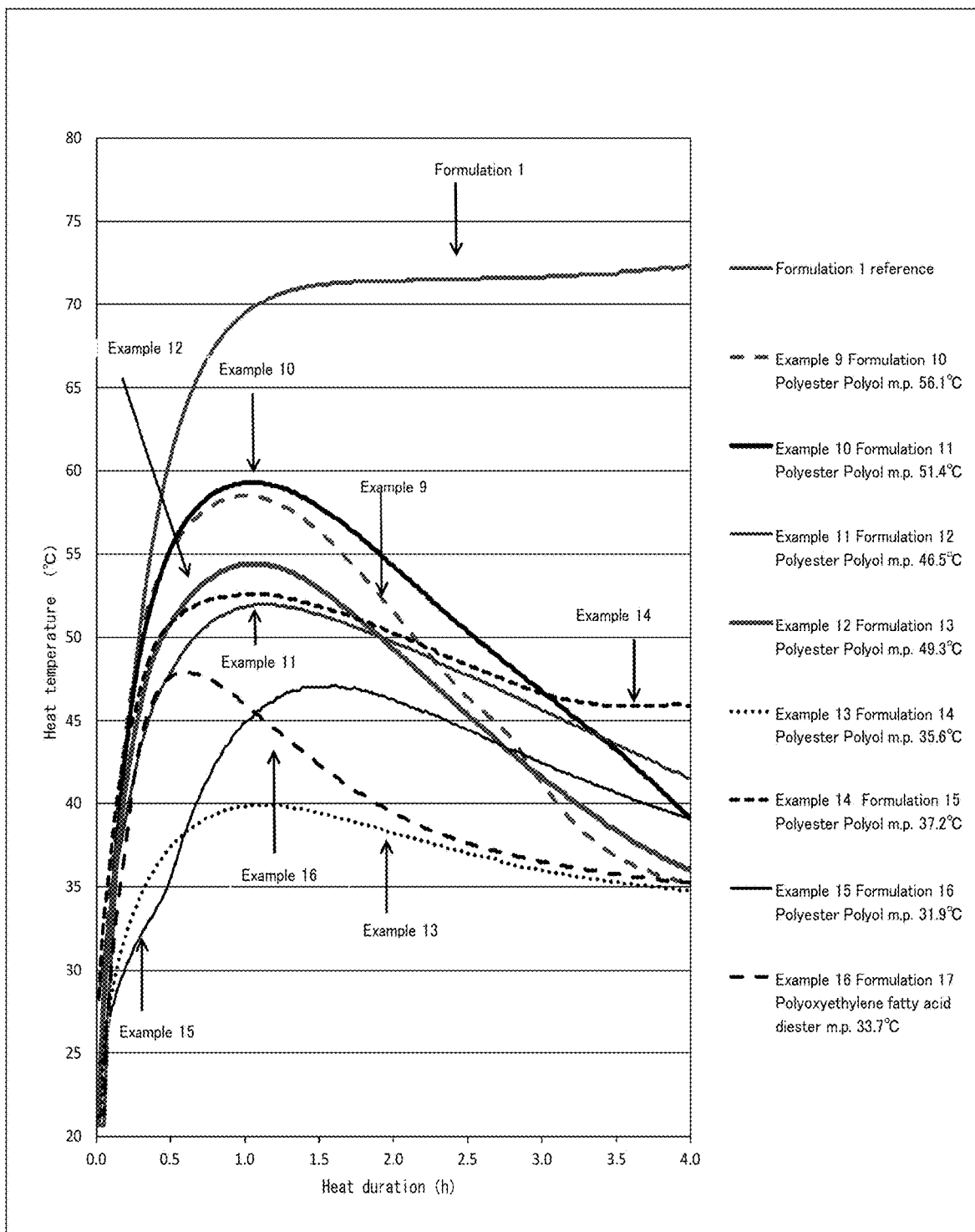
FIG. 2 is a diagram showing heat generation patterns of warming materials charged with the heat-generating compositions of Examples 9 to 16.
Figure 3:
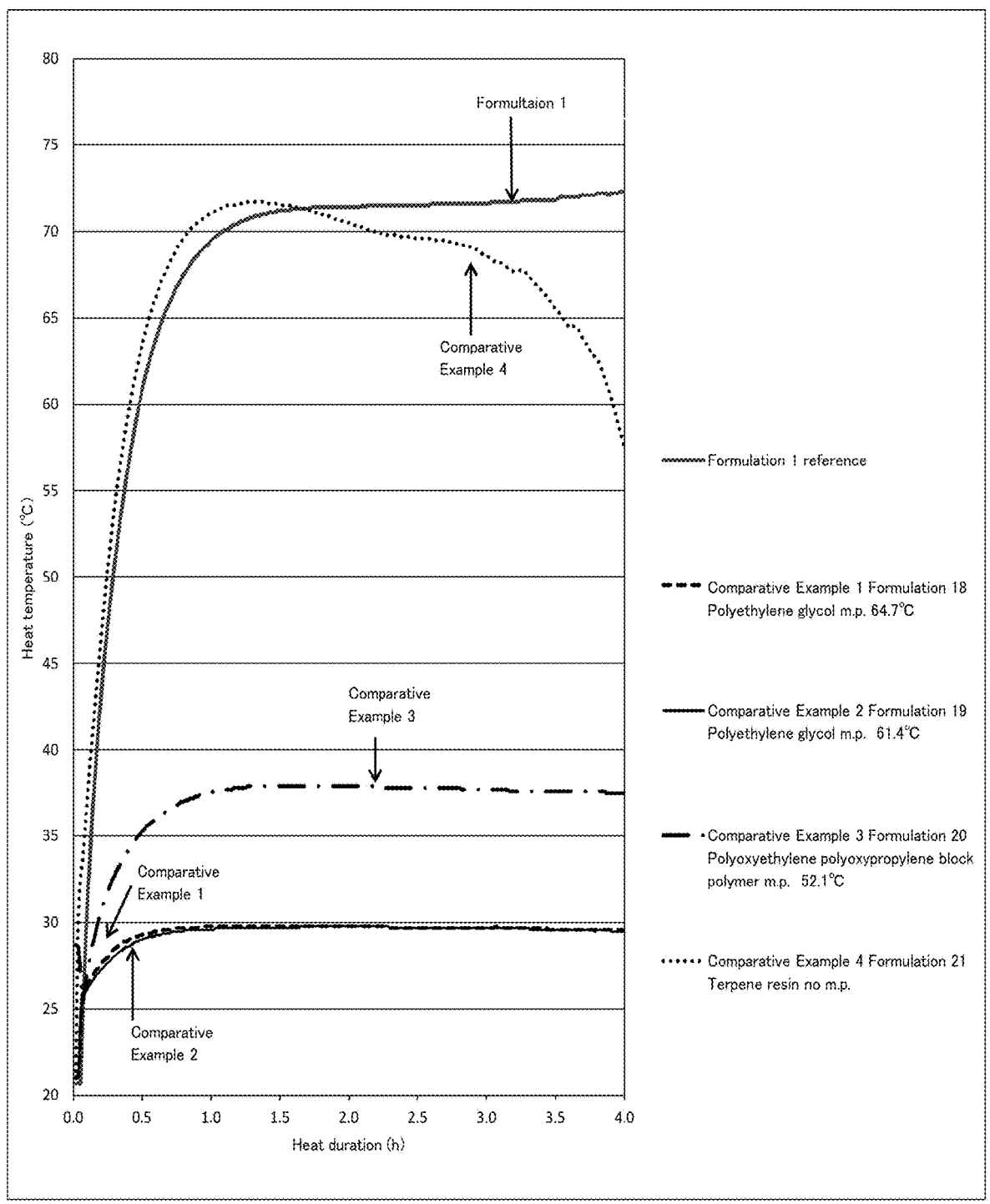
FIG. 3 is a diagram showing heat generation patterns of warming materials charged with the heat-generating compositions of Comparative Examples 1 to 4.
Figure 4:
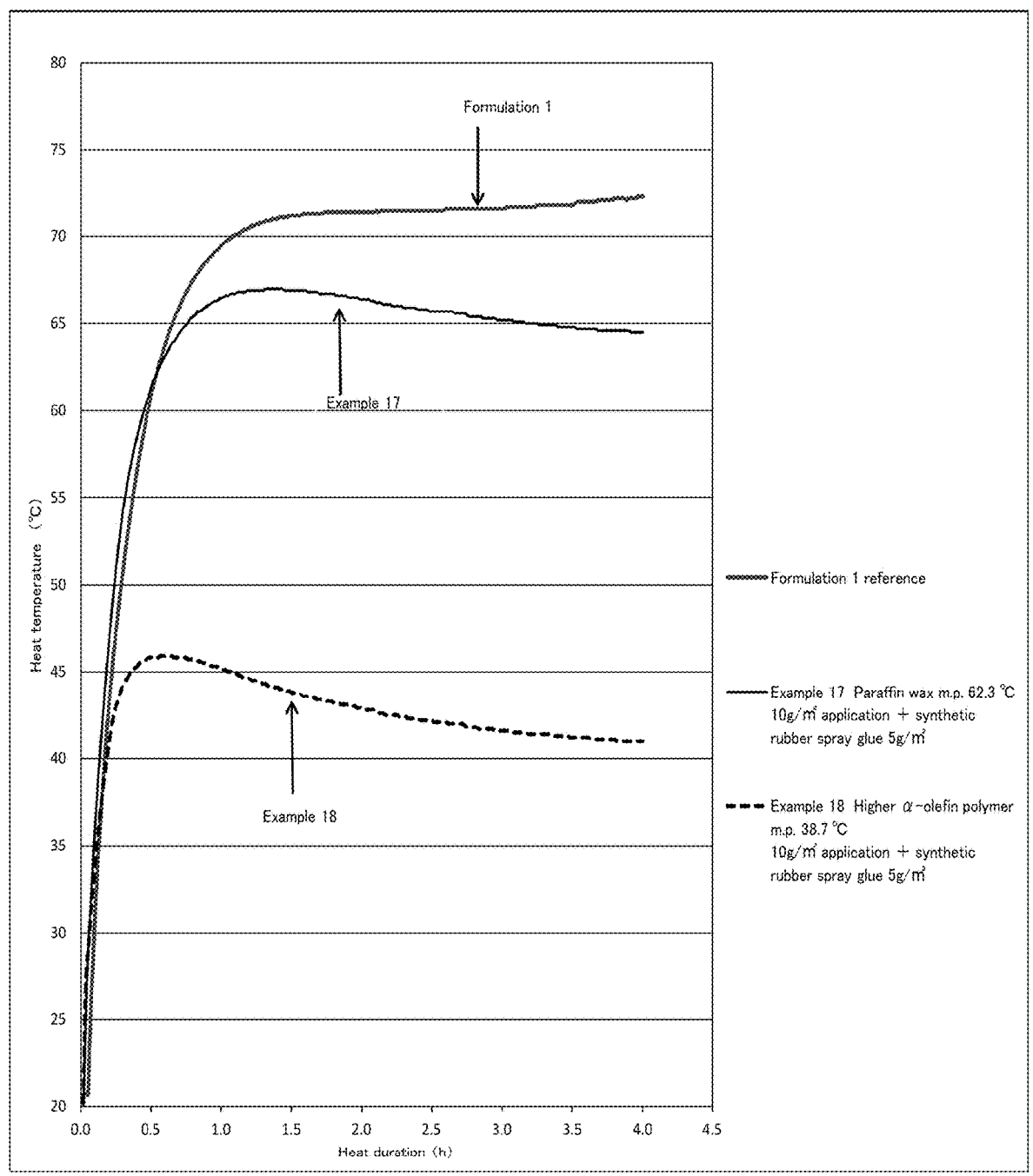
FIG. 4 is a diagram showing heat generation patterns of warming materials using the air-permeable packaging materials of Examples 17 and 18.

Regarding a disposable body warmer in the case of not using the temperature control agent, the maximum temperature became 70° C. or higher. On the other hand, in the disposable body warmers of Examples 1 to 18, the heat generation temperature was controlled to the maximum temperature corresponding to the melting point of the used temperature control agent (FIGS. 1, 2, and 4). In contrast, in the disposable body warmers using the compounds of Comparative Examples 1 to 4, the temperature control effect was not observed, or heat generation was inhibited regardless of the melting point and sufficient heat generation was not obtained (FIG. 3).

<Test of Reconstructing Use State Before and After Bedtime>

Figure 5:
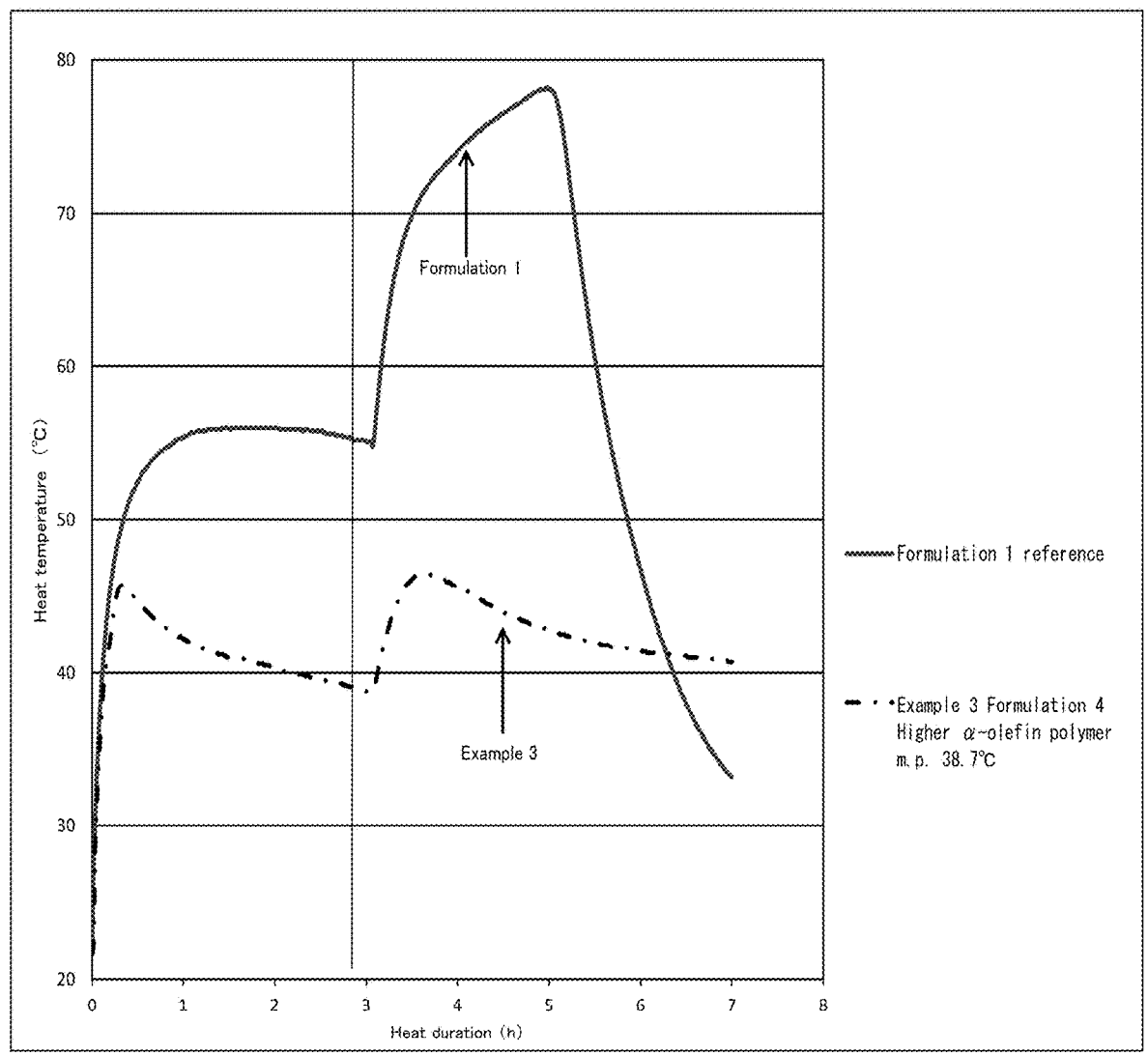
FIG. 5 is a diagram showing a heat generation pattern of the warming material charged with the heat-generating composition of Example 3 under the conditions that the use state of the warming material during sleeping is simulated (after 3 hours from the heat generation start).

The disposable body warmer produced by using the heat-generating composition of Example 3 and the same materials and method as described above was subjected to the heat generation test under the same conditions as described above according to JIS S4100 "Disposable Body Warmers." However, the disposable body warmer was entirely covered with eight layers of flannel cloth not at the time point of heat generation start, but at the time point of 3 hours after heat generation start, and then heat generation was further continued. Covering with flannel clothes is to simulate a use state while sleeping with bedclothes. The results thereof are shown in FIG. 5.

In the disposable body warmer not using the temperature control agent, the temperature rapidly increased immediately after the disposable body warmer was covered with clothes and reached a temperature near 80° C. On the other hand, in the disposable body warmer of Example 3, a slight increase in temperature was observed after the disposable body warmer was covered with clothes, but an increase in temperature was suppressed to about 45° C. and then the temperature was maintained in an appropriate temperature range.

<Production of Moxibustion Tool>

(1) Production of Container

A cup-shaped molded article (a container body) can be produced in such a manner that a heater is assembled in a metallic prototype mold (upper: a pressing mold, lower: a receiving mold), the upper and lower molds are heated to 100° C. or higher, a moldable non-woven fabric is interposed between the upper and lower molds, and then a pressure is applied thereto for a few seconds by an air cylinder.

Alternatively, a container body was produced by the following method. A prototype mold made of wood (upper: a cylindrical rod, lower: a receiving wood mold having a hole formed therein) was prepared, and the pressing surface of the cylindrical rod was heated to 200° C. by a hot stirrer or hot plate for test. A moldable non-woven fabric placed on the receiving wood mold was pressed by the heated rod to thereby produce a cup-shaped molded article. Incidentally, the air permeability degrees of the used moldable PET non-woven fabric (Asahi Kasei Corp., "Smash Y15250"), moldable polypropylene (PP) non-woven fabric (Idemitsu Unitech Co., Ltd., "Stratech RW2250"), PET/PP non-woven fabric for top member, and PET/LLDPE/PP non-woven fabric for top member measured by a Gurley method (KUMAGAI RIKI KOGYO Co., Ltd., GURLEY DENSOMETER) all are 0 sec/100 cc, and all the fabrics have no oxygen ventilation resistance that inhibits oxidation reaction of iron powder.

(2) Production of Heating Composition Tablet

A heat-generating composition (tablet) was produced by using iron powder (Powdertech Co., Ltd., reduced iron powder "NRD-3K"), activated carbon (Japan EnviroChemicals, Ltd., coconut shell activated carbon "S-5"), a salt (Nihonkaisui Co., Ltd., ordinary salt), a water absorptive polymer (Sanyo Chemical Industries, Ltd., a polyacrylic resin "ST-500D"), crystalline cellulose (Asahi Kasei Chemicals Corporation, crystalline cellulose "Ceolus TG 101"), and the compound of Example 1 (Hokoku Corporation, a higher α-olefin polymer HS Crysta 6100, melting point: 59.5° C.) serving as a temperature control agent, in the following manner. The composition of the heat-generating composition is as presented in Table 4. (In the table, the unit of content is "part(s) by weight.")

First, in consideration of the bulk specific weight and the particle diameter, the cellulose, the temperature control agent, the water absorptive polymer, the activated carbon, and the iron were sequentially weighed and then added into a beaker in this order. The added materials were evenly stirred with a medical spoon so as to resolve uneven distribution of each raw material. 1 g of this mixed raw material was weighed and then tableted by "Desktop Prototype Tabletting Machine QUICK MINI FY-TQM-30" FUJI YAKUHIN KIKAI Co., Ltd. (tabletting pressure: 10 KN). A cylindrical tablet having a diameter of 14 mm and a thickness of 4 mm was produced by using a pressing mold having a diameter of 13.9 mm and a receiving mold having an inner diameter of 14 mm.

TABLE 4

| | | Example | | | | Example |
|---|---|---|---|---|---|---|
| | | 19 | 20 | 21 | 22 | 1 |
| | | Formul. | Formul. | Formul. | Formul. | Formul. |
| | | 22 | 23 | 24 | 25 | 26 |
| | | 0123 | 1211-4 | 1208-3 | 1201-1 | 0929-1 |
| | Material | Formul. | Formul. | Formul. | Formul. | Formul. |
| Basic formulation (Parts by weight) | Iron Powder | 43.1 | 42.2 | 44.3 | 43.6 | 39.9 |
| | Activated carbon | 3.3 | 4.7 | 3.5 | 4.8 | 6.2 |

TABLE 4-continued

| | | Example | | | | Example |
|---|---|---|---|---|---|---|
| | | 19 | 20 | 21 | 22 | 1 |
| | | Formul. 22 | Formul. 23 | Formul. 24 | Formul. 25 | Formul. 26 |
| | Material | 0123 Formul. | 1211-4 Formul. | 1208-3 Formul. | 1201-1 Formul. | 0929-1 Formul. |
| | Water absorptive polymer | 4.8 | 4.7 | 4.9 | 4.8 | 4.4 |
| | Crystalline cellulose | 19.1 | 18.8 | 19.7 | 19.3 | 17.8 |
| | Ordinary salt | 2.6 | 2.6 | 2.4 | 2.4 | 3.1 |
| | Water | 27.1 | 27.0 | 25.2 | 25.1 | 28.6 |
| Heat-generating composition subtotal | | 100.0 | 100.0 | 100.0 | 100.0 | 100.0 |
| Temperature control agent | HS Crysta 6100 | 28.7 | 28.2 | 19.7 | 19.3 | 0.0 |
| Composition total | | 128.7 | 128.2 | 119.7 | 119.3 | 100.0 |

(3) Production of Moxibustion Tool

Figure 6:
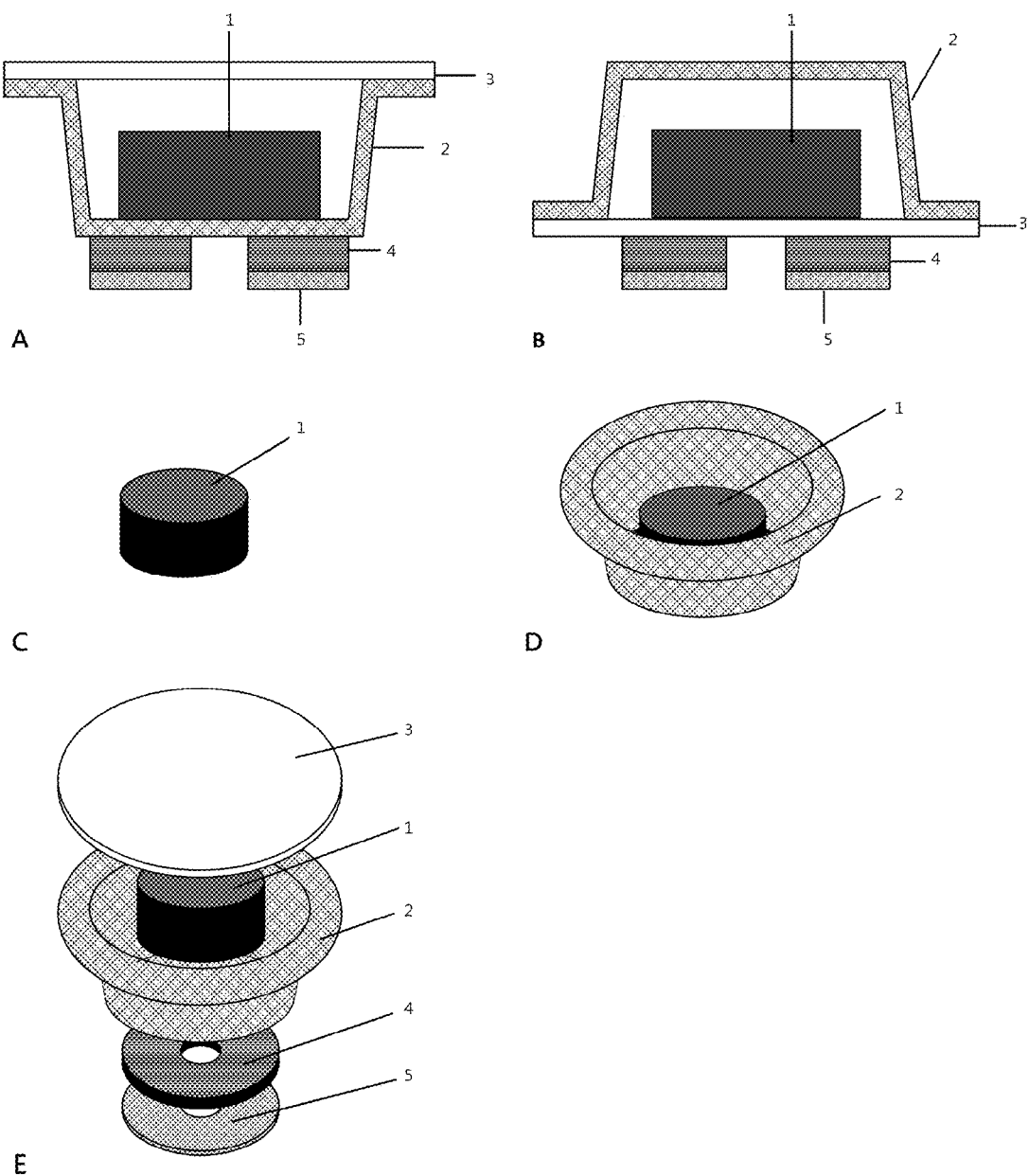
FIG. 6 is a diagram illustrating an example of the structure of a meridian stimulation warming tool (a moxibustion tool) of the invention. Panels A and B are cross-sectional views of the moxibustion tool, Panel C is a perspective view of a heat-generating composition tablet (1), Panel D is a perspective view illustrating a state where the heat-generating composition tablet (1) is input to a container body (2), and Panel E is a perspective view illustrating the container body (2) having the heat-generating composition tablet (1) input therein along with a top member (3), a seat (4), and a pressure-sensitive adhesive layer (a pressure-sensitive adhesive tape) (5) that are appended to the container body. The seat may not be provided. Incidentally, the heat-generating composition tablet (1) in FIG. 6 is schematically illustrated in the form before salt water (or water) is added (before swelling).

A moxibustion tool was produced as follows. First, a tablet was input to each of molded non-woven fabric container bodies respectively produced above, and a top member (a PET/PP non-woven fabric, TEIJIN LIMITED "Unisel Melfit BT060," or a PET/LLDPE/PP non-woven fabric, Idemitsu Unitech Co., Ltd. "Stramighty MEM1060," or an outer bag film for body warmer KOP 30 μm/LDPE 25 μm/LLDPE 30 μm (having no air permeability) Meiwa Pax Co., Ltd.) was pasted to the upper portion of the container by a household iron. A double-sided pressure-sensitive tape material was pasted directly or via a seat to the bottom portion of the outside of the container to thereby producing a moxibustion tool schematically illustrated in Panel A of FIG. 6. As the seat, a circular product obtained by pasting sheets of drawing paper having a thickness of 0.75 mm to each other by a wood bond (Konishi Co., Ltd.), punching the sheet(s) into a circular shape (diameter: 16 mm) using a punch and then forming a through-hole (diameter: 3 to 5 mm) by a drill at the center was used.

0.3 g of 8.8% by weight salt water with respect to 1 g of tablet was injected from the top member by using an injector unless otherwise stated. It is noted that in Reference example 1 (0929-1 formulation), a salt was added at the time of producing a mixed raw material and 0.4 g of water with respect to 1 g of tablet was added after forming a tablet.

The moxibustion tool thus obtained was sealed in an oxygen/water vapor permeation barrier KOP film bag for body warmer (a KOP/LDPE/LLDPE outer bag for a commercially available body warmer).

<Heat Generation Test of Moxibustion Tool>

The heat generation test was performed by using, as a covering material, eight layers of flannel cloth of cotton 100% and texcounts 5.905 two-fold yarn under conditions including an ambient temperature of 20±1° C., a wind speed of 0.5 m/s or less (dead calm), an ambient humidity of 55 to 70%, and 30±1° C. of a warming portion of a warming apparatus configured by a warmer and a water circulating thermostatic bath. It is noted that, since the moxibustion tool is pasted directly onto the skin at the time of use, measurement was also performed in a case where the moxibustion tool was pasted directly onto the surface of the warmer without the covering material.

(1) Influence of Container Material and Top Member

The heat generation test was performed in such a manner that 8 L/min of hot water was circulated in a tank-shaped warmer with a size of W 615×D 410×H 60 mm (using a vinyl chloride plate having a thickness of 8 mm) equipped with a water-circulating thermostatic bath and installed in a constant temperature room (room temperature: 20° C., humidity: 65%) to control the surface temperature of the warmer (vinyl chloride plate) to 30° C., and a moxibustion tool sample was pasted onto the vinyl chloride plate of the warmer surface with the container body faced downward, and a temperature measurement sensor pasted onto substantially the center of the bottom surface of the container body with a double-sided tape (temperature measurement machine: SATOSHOJI CORPORATION, "THERMOMETER 475D," sensor: Anritsu Meter Co., Ltd., "ST-22E-003").

As a heat-generating composition tablet of the moxibustion tool, Examples 19 and 20 were used. The maximum temperatures of the moxibustion tools produced by using each combination of a tablet, a container, and a top member are presented in Table 5.

TABLE 5

| | Container | Top member | Max. temperature (° C.) |
|---|---|---|---|
| Example 19 | Y15250 | KOP | 53.9 |
| Formulation 22 | Y15250 | BT060 | 54.2 |
| | Y15250 | MEM1060 | 53.9 |
| | RW2250 | KOP | 54.4 |
| | RW2250 | BT060 | 55.2 |
| | RW2250 | MEM1060 | 54.8 |
| Example 20 | Y15250 | KOP | 57.7 |
| Formulation 23 | Y15250 | BT060 | 56.4 |
| | RW2250 | KOP | 56.7 |
| | RW2250 | MEM1060 | 56.7 |

In the table, Y15250 indicates a moldable PET non-woven fabric (Asahi Kasei Corp., "Smash Y15250"); RW2250 indicates a moldable PP non-woven fabric (Idemitsu Unitech Co., Ltd., "Stratech RW2250"); KOP indicates an outer bag film for body warmer (Meiwa Pax Co., Ltd., KOP/LDPE/LLDPE); BT060 indicates a PET/PP non-woven fabric, TEIJIN LIMITED "Unisel Melfit BT060"; and MEM1060 indicates a PET/LLDPE/PP non-woven fabric, Idemitsu Unitech Co., Ltd., "Stramighty MEM1060."

From the above results, it is clearly seen that the warming material using the heat-generating composition which contains the temperature control agent of the invention is not almost affected by the materials of the container in terms of heat generation temperature.

(2) Influence of Skin Temperature and Room Temperature

Whether the heat generation temperature of the moxibustion tool of the invention is affected by a difference in the skin temperature of a user or room temperature at the time of use was examined. As a heat-generating composition tablet of the moxibustion tool, Examples 21, 22, and 19 were used, Y15250 was used for a container packaging material, and KOP was used for a top member.

For comparison, commercially available disposable body warmers not containing the temperature control agent of the invention ("KOWA Haru HotKairo Nukunuku Toban Mini (KOWA Stick-Type Hot Warmer Warm and Comfy Duty Mini)," lot number: 409184, expiration date: 2018 April (hereinafter, abbreviated as "HM") and "KIRMAI Body Warmer—Non-Stick-Type (Regular)," lot number: 140513-07, expiration date: 2018 April (hereinafter, abbreviated as "R")) were used.

Figure 7:
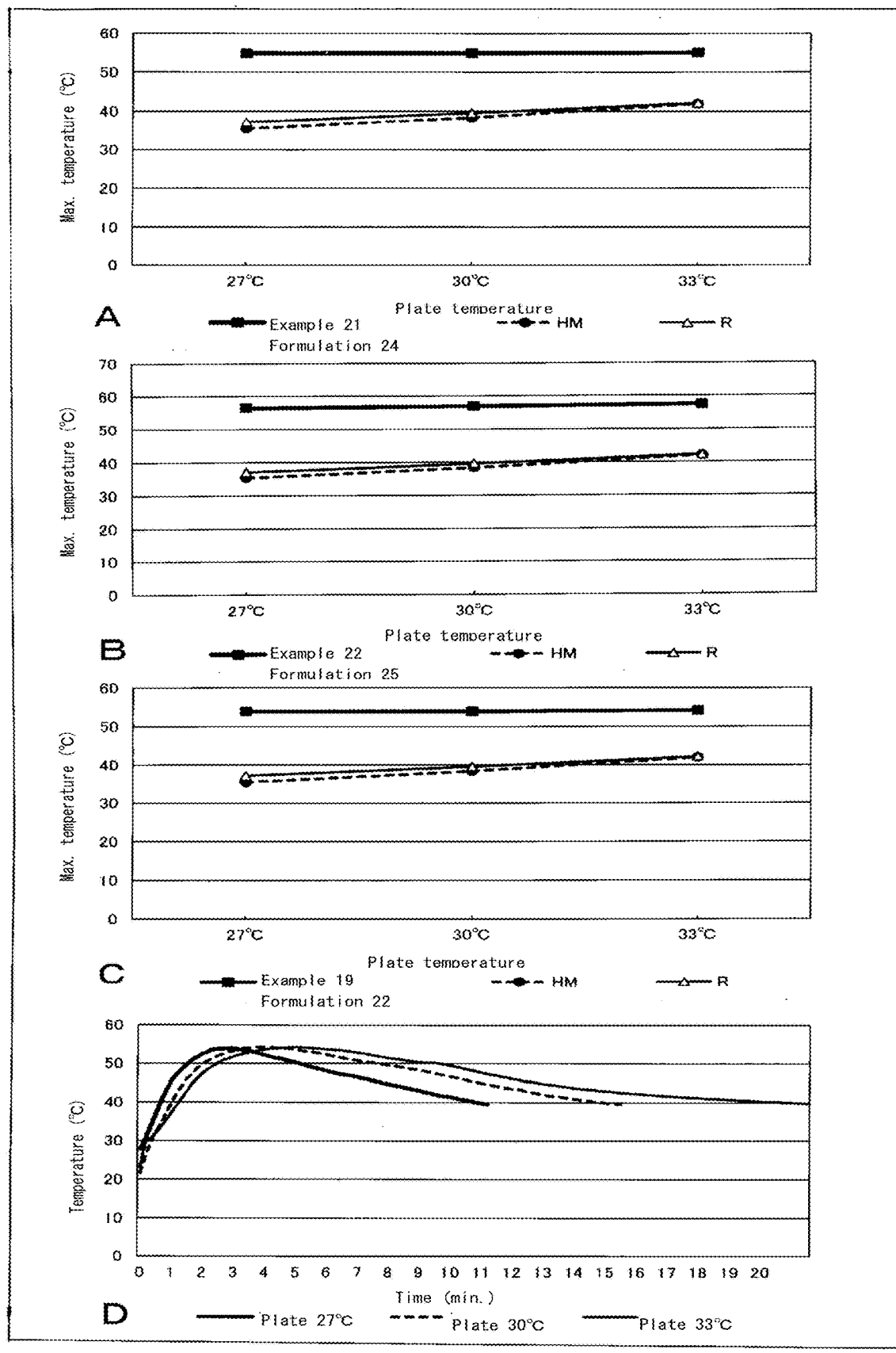
FIG. 7 is a diagram showing results obtained by measuring presence or absence of influence of a plate temperature on a maximum temperature of a moxibustion tool at room temperature (20° C.). Panel A shows a case where a moxibustion tool using Example 21 (1208-3 formulation) is used, Panel B shows a case where a moxibustion tool using Example 22 (1201-1 formulation) is used, and Panels C and D show cases where a moxibustion tool using Example 19 (0123 formulation) is used.

The results (maximum temperatures) in a case where the plate temperature assumed as the skin temperature at room temperature (20° C.) is changed to 27° C., 30° C., and 33° C. are presented in the following Table 6 and FIG. 7.

TABLE 6

| | Max. temperature (° C.) | | | | |
|---|---|---|---|---|---|
| Plate temperature | Example 21 Formulation 24 | Example 22 Formulation 25 | Example 19 Formulation 22 | HM | R |
| 27° C. | 54.9 | 56.5 | 53.9 | 35.5 | 37.2 |
| 30° C. | 55.0 | 56.9 | 53.9 | 38.4 | 39.6 |
| 33° C. | 55.2 | 57.4 | 54.2 | 42 | 42.2 |

Figure 8:
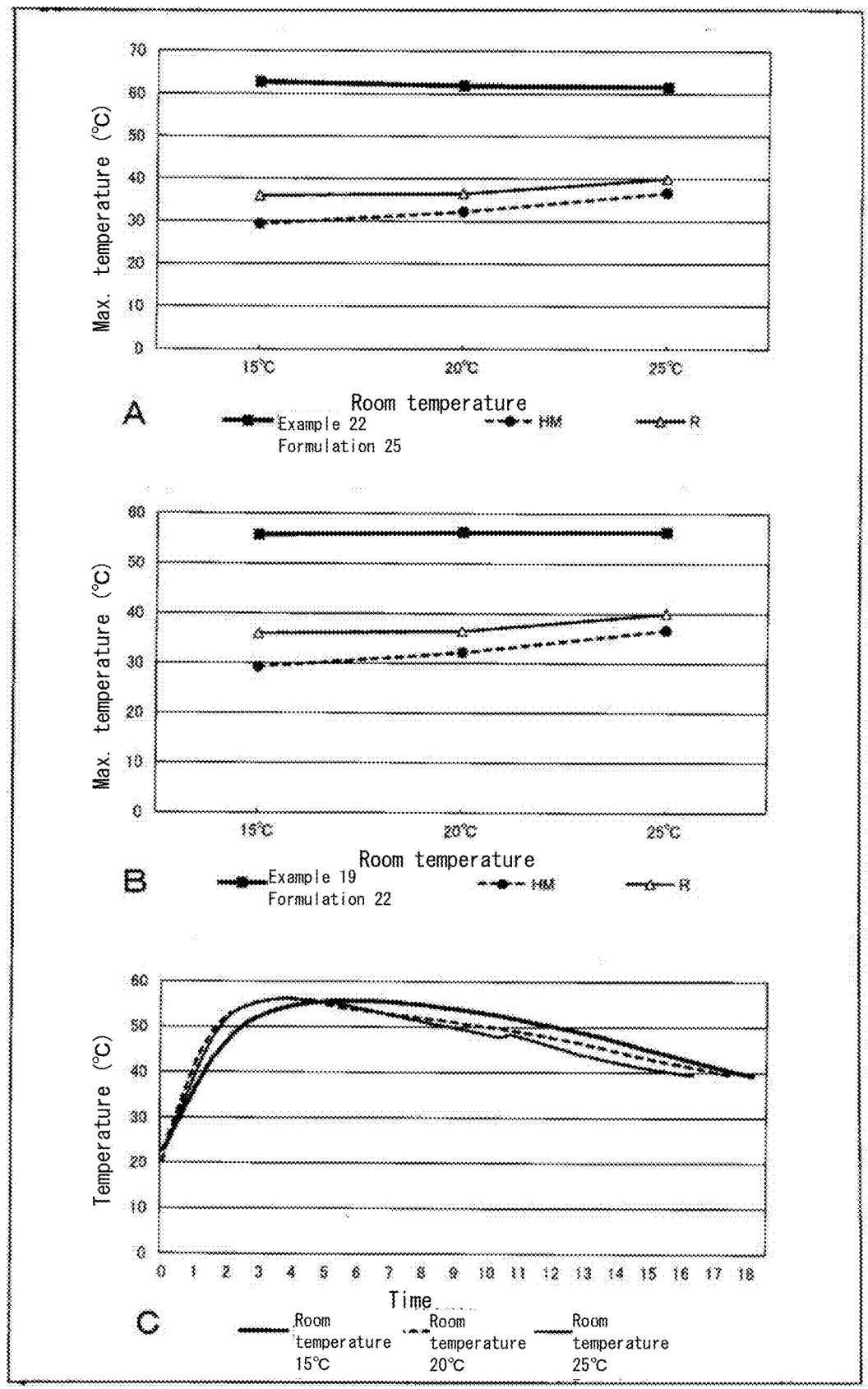
FIG. 8 is a diagram showing results obtained by measuring presence or absence of influence of room temperature on a maximum temperature of a moxibustion tool at room temperatures of 15° C., 20° C., and 25° C. Panel A shows a case where a moxibustion tool using Example 22 is used, and Panels B and C show cases where a moxibustion tool using Example 19 is used.

In the same heat generation test as described above, measurement was performed using Examples 22 and 19 (Y15250 was used for a container packaging material and KOP was used for a top member) on a foamed polyethylene plate (thickness: 5 mm) instead of the hot-water circulation plate, at room temperatures of 15° C., 20° C., and 25° C. The results thereof (maximum temperature) are presented in the following Table 7 and FIG. 8.

TABLE 7

| | Max. temperature (° C.) | | | |
|---|---|---|---|---|
| Room temperature | Example 22 Formulation 25 | Example 19 Formulation 22 | HM | R |
| 15° C. | 62.8 | 55.7 | 29.3 | 36 |
| 20° C. | 62 | 56.2 | 32.2 | 36.5 |
| 25° C. | 61.7 | 56.3 | 36.7 | 40 |

From the above results, it is found that the maximum temperature varies depending on changes in plate temperature and room temperature in all of the commercially available warming materials; on the other hand, the maximum temperature of the warming material using the heat-generating composition, which contains the temperature control agent of the invention, is not affected by the skin temperature of the user or room temperature at the time of use and the warming material can be used at a predetermined maximum temperature. Incidentally, it was observed that the maximum temperature of the tablet of Example 22 tested in Table 7 increased by about 4 to 6° C., as compared to the maximum temperature of 57° C. when measured using the hot-water circulation plate (30° C.). The reason for this is considered that hot water is not circulated so that heat is accumulated on the foamed polyethylene surface.

(3) Influence of Covering Material

The moxibustion tool of the invention does not use fire, and thus it can be attached to the underneath of clothes and used. Herein, whether the maximum temperature changes was examined in a case where the moxibustion tool was covered with a flannel cloth assumed as clothes and a case where the moxibustion tool was not covered with a flannel cloth.

Figure 9:
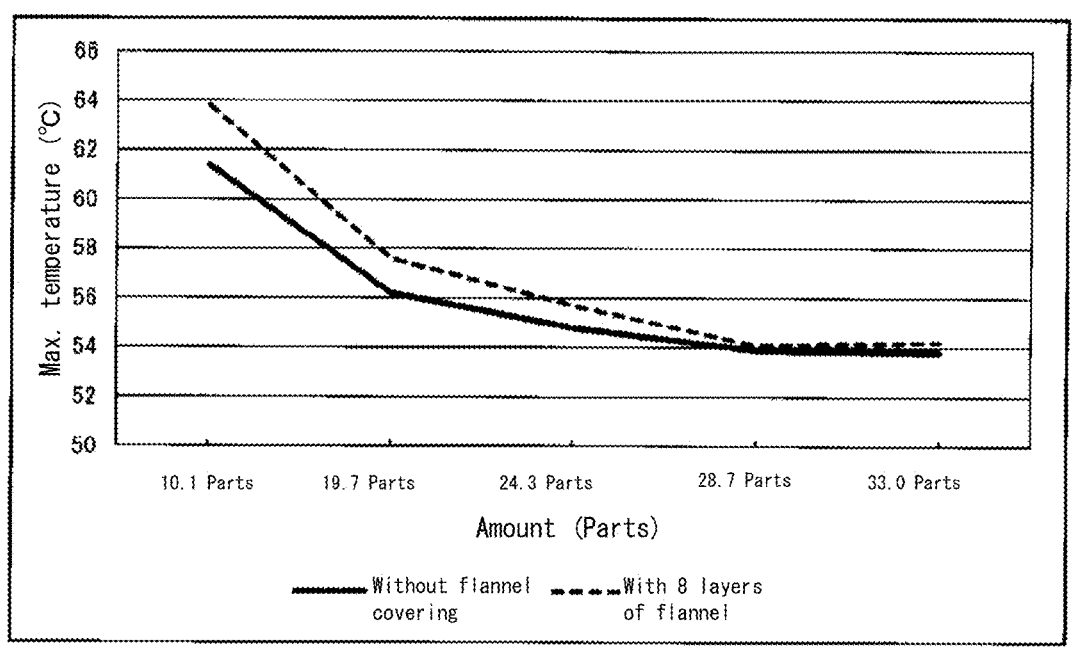
FIG. 9 is a diagram showing results obtained by examining the influence of covering with flannel on a maximum temperature of a moxibustion tool while the content of a temperature control agent of the invention is changed.

Regarding the formulation of the heat-generating composition tablet, Example 19 was used as a basic formulation, and the content of HS Crysta 6100 was changed from 10.1 to 33.0 parts by weight (1.0 g of tablet was produced by using 43.1 parts by weight of iron powder, 3.3 parts by weight of activated carbon, 4.8 parts by weight of water absorptive polymer, 19.1 parts by weight of crystalline cellulose, and 10.1 to 33.0 parts by weight of HS Crysta 6100, and then 0.3 g of 8.8% by weight salt water was added). The results thereof are presented in Table 8 and FIG. 9.

TABLE 8

| | HS Crysta 6100 | Without flannel covering (° C.) | With 8-layers of flannel covering (° C.) | Difference (° C.) |
|---|---|---|---|---|
| Moxibustion tool | 10.1 Parts | 61.4 | 63.8 | 2.4 |
| | 19.7 Parts | 56.2 | 57.6 | 1.4 |
| | 24.3 Parts | 54.8 | 55.7 | 0.9 |
| | 28.7 Parts | 53.9 | 54.1 | 0.2 |
| | 33.0 Parts | 53.8 | 54.2 | 0.4 |
| HM | — | 38.4 | 44.4 | 6.0 |
| R | — | 39.6 | 44.8 | 5.2 |

Differences between maximum temperatures in the presence and absence of covering with flannel were 0.2 to 2.4° C. in the warming materials of the invention; in contrast, differences between maximum temperatures in the presence and absence of the flannel covering in commercially available body warmers HM and R which were measured similarly for comparison were 6.0° C. and 5.2° C., respectively. Therefore, it is found that when the commercially available body warmer is covered with clothes, the maximum temperature varies; on the other hand, the moxibustion tool using the heat generating agent, which contains the temperature control agent of the invention, shows a small variation in maximum temperature even when it is covered with clothes.

(4) Comparison of Heating Composition of Powder or Solid (Tablet) Form

As a heat-generating composition for use in the moxibustion tool of the invention, the powder form and the solid (tablet) form were compared with each other. As the formulation of the heat-generating composition, Example 19 was used. However, since 0.7 g is the upper limit amount of the powder heat-generating composition which can be charged in the container produced in the above-described size, the tablet was produced with 0.7 g of the heat-generating composition, and accordingly, the amount of 8.8% by weight salt water was adjusted to 0.2 g.

The results obtained by measuring five samples each of the moxibustion tools using powder and a tablet (container: Y15250, top member: MEM1060) are presented in Table 9.

TABLE 9

| | Max. temperature (° C.) | |
|---|---|---|
| Sample No. | Powder | Tablet |
| 1 | 42 | 52.9 |
| 2 | 42.3 | 53 |
| 3 | 44.6 | 53.1 |
| 4 | 47 | 53.3 |
| 5 | 54.7 | 53.3 |
| Average ± SD | 46.1 ± 5.2 | 53.1 ± 0.18 |

As described above, it is found that a variation in maximum temperature in the case of using a solid heat-generating composition is smaller than that in the case of powder. The reason for this is considered that in the case of a mixed powder containing salt water, a significant amount of oxygen reaction loss occurs in each of processes of mixing powder, charging powder in the container, and sealing the top member, and the powder excluding salt water is easily attached to a molding container flange portion (a sealing portion) when the powder is charged in the container. Further, the reason for this is considered that the salt water is not uniformly penetrated as compared with a tablet and thus uneven distribution easily occurs so that heat generation is likely to become non-uniform. On the other hand, it is found that in the case of a tablet obtained by tableting, penetration of salt water becomes uniform and a variation in maximum temperature does not almost occur. Therefore, it is found that when the heat-generating composition of the invention is formed in a solid form, more stable maximum temperature can be provided, and particularly in a warming material in which the amount of the heat-generating composition to be charged is small, such as a moxibustion tool, the heat-generating composition in the solid form is more suitable.

(5) Control of Highest Temperature by Seat and the Like

Whether the maximum temperature can be controlled by a seat between a moxibustion tool body and a skin pressure-sensitive adhesion layer was examined.

In this test, as a seat provided below the moxibustion tool body, drawing paper having a thickness of 0.75 mm/sheet was used. Combining of drawing paper was performed using a wood glue. The seat was adjusted to have a diameter of 16 mm and then the maximum temperature was measured while the number of sheets to be stacked and the hole diameter are changed. As the formulation of the heat-generating composition tablet, Reference Example 1 was used.

Figure 10:
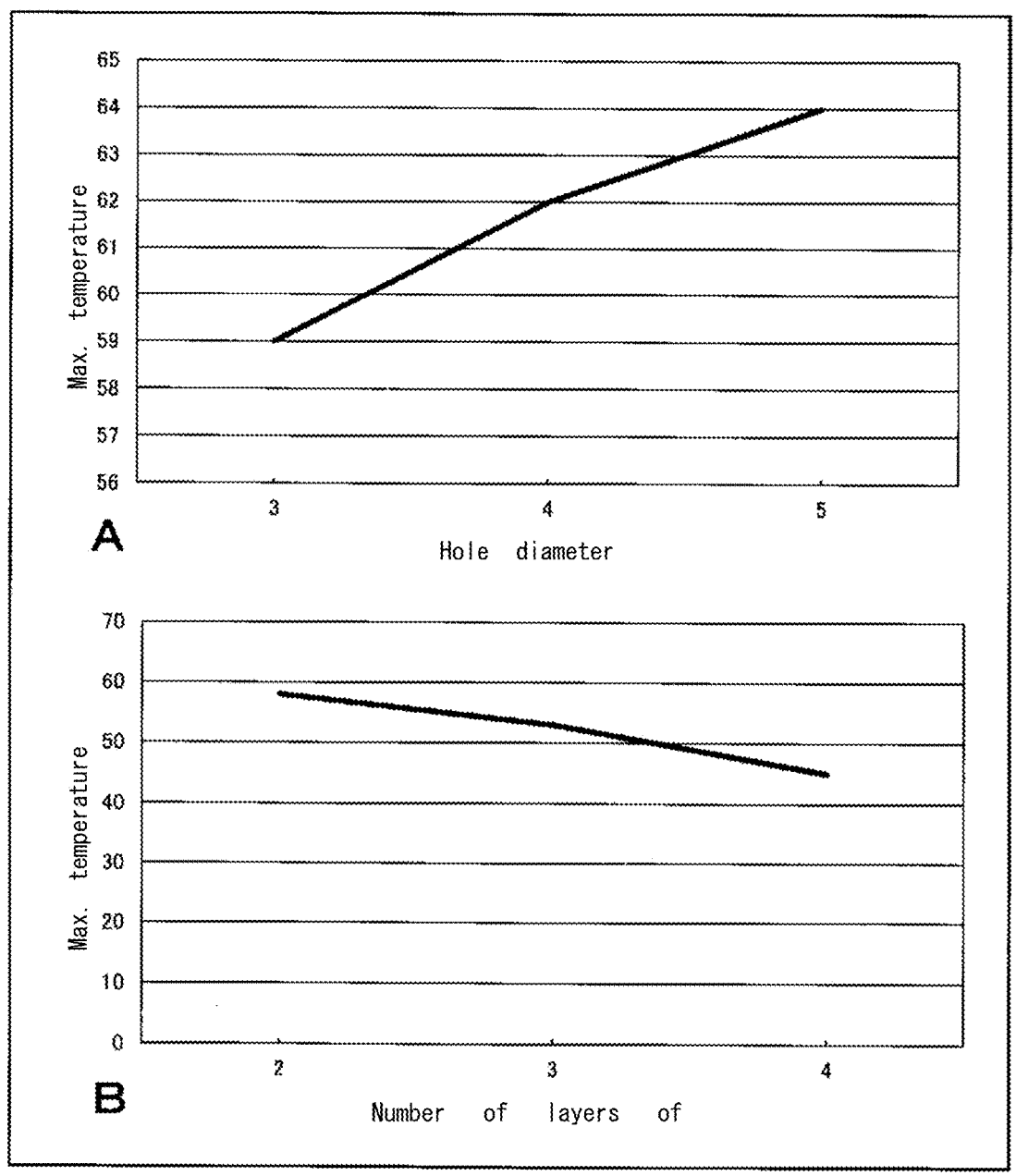
FIG. 10 is a diagram showing results obtained by examining the influence of a hole diameter and thickness of a seat on a maximum temperature of a moxibustion tool. Panel A shows the influence of the hole diameter and Panel B shows the influence of the thickness.

The results thereof are shown in FIG. 10 respectively. Panel A shows results when the hole diameter of the seat having a thickness of three sheets of drawing paper are changed to 3, 4, and 5 mm and Panel B shows results when the number of sheets of drawing paper with no hole is changed to 2, 3, and 4 and then examination is conducted.

As a result of the test, it is found that the maximum temperature of the moxibustion tool at the skin surface can be controlled by controlling a distance between the moxibustion tool body and the attachment surface of the skin by the thickness of the seats or by controlling the hole diameter of the seat.

EXPLANATIONS OF LETTERS OR NUMERALS

1 HEATING COMPOSITION
2 CONTAINER (BODY)
3 TOP MEMBER
4 SEAT
5 PRESSURE-SENSITIVE ADHESIVE LAYER

This application is based on Japanese Patent Application No. 2014-213678 filed Oct. 20, 2014 and Japanese Patent Application No. 2015-074826 filed Apr. 1, 2015, and the entire disclosure of the specifications, drawings, and claims of Japanese Patent Application Nos. 2014-213678 and 2015-074826 is incorporated herein.

What is claimed is:

1. A heat-generating composition, comprising:
a temperature control agent and a mixture comprising 35 to 80% by weight of metallic powder, 1 to 10% by weight of a salt, 5 to 45% by weight of water, and 1 to 20% by weight of activated carbon,
wherein the temperature control agent comprises one or more aliphatic compounds having a melting point of 35° C. to 65° C. and a water solubility of 0.05 g/mL or less at 20° C.,
wherein the temperature control agent is present at 3 to 40 parts by weight with respect to 100 parts by weight of the mixture,
wherein the heat-generating composition further comprises a binder and is made into a tablet,
and wherein the temperature control agent comprises one or more compounds selected from the group consisting of a higher α-olefin polymer, polyester polyol, and polyoxyethylene fatty acid diester.

2. A warmer, comprising: the heat-generating composition of claim 1 and a bag or container, wherein the bag or container contains the heat-generating composition and has air permeability in at least a part thereof.

3. The warmer according to claim 2, further comprising a means for fixing the bag or container to an object to be heated.

4. The warmer according to claim 3, further comprising an airtight outer bag that substantially blocks oxygen, wherein the airtight outer bag encloses the bag or container that contains the heat-generating composition.

5. The warmer according to claim 2, further comprising an airtight outer bag that substantially blocks oxygen, wherein the airtight outer bag encloses the bag or container that contains the heat-generating composition.

6. The warmer according to claim 2, which is a disposable body warmer or a medical instrument.

7. The warmer according to claim 6, in which the medical instrument is a hot pack or a meridian stimulation warming tool.

8. The heat-generating composition according to claim 1, wherein the binder is selected from the group consisting of cellulose, lactose, starch, dextrin, sucrose ester, Teflon, polyethylene glycol, and carboxymethyl cellulose.

9. A warmer, comprising: the heat-generating composition according to claim 8.

10. The warmer according to claim 9, which is a meridian stimulation warming tool.

11. The warmer according to claim 10, further comprising a means for fixing the bag or container to an object to be heated.

12. The warmer according to claim 10, further comprising an airtight outer bag that substantially blocks oxygen, wherein the airtight outer bag encloses the bag or container that contains the heat-generating composition.

13. The warmer according to claim 9, further comprising a means for fixing the bag or container to an object to be heated.

14. The warmer according to claim 9, further comprising an airtight outer bag that substantially blocks oxygen, wherein the airtight outer bag encloses the bag or container that contains the heat-generating composition.

15. The heat-generating composition according to claim 1, wherein the temperature control agent comprises a higher α-olefin polymer.

16. The heat-generating composition according to claim 1, wherein the temperature control agent comprises a polyester polyol.

17. The heat-generating composition according to claim 1, wherein the temperature control agent comprises a polyoxyethylene fatty acid diester.

18. The heat-generating composition according to claim 1, wherein the temperature control agent is a higher α-olefin polymer and is present at 3 to 30 parts by weight with respect to 100 parts by weight of the mixture, and wherein the binder comprises crystalline cellulose and is present at 10 to 30 parts by weight of the mixture.

19. A moxibustion tool, comprising: the heat-generating composition according to claim 1.

20. The heat-generating composition according to claim 1, wherein the temperature control agent is in powder form and admixed with the mixture.

21. A warmer, comprising: the heat-generating composition of claim 1 and a bag or container, wherein the bag or container contains the heat-generating composition and wherein at least a part of the bag or container is made of an air permeable packaging material having an air permeability degree of 0 sec/100 cc.

22. The warmer according to claim 21, which is a moxibustion tool.

23. A warmer, comprising: the heat-generating composition of claim 1 and a bag or container, wherein the bag or container contains the heat-generating composition and wherein at least a part of the bag or container is made solely from a non-woven fabric.

24. The warmer according to claim 23, which is a moxibustion tool.

25. A warmer, comprising: the heat-generating composition of claim 1 and a bag or container, wherein the bag or container contains the heat-generating composition and wherein at least a part of the bag or container is made of an air permeable packing material having no oxygen ventilation resistance that inhibits oxidation reaction of iron powder.

26. The warmer according to claim 25, which is a moxibustion tool.

27. The heat-generating composition according to claim 1, wherein the temperature control agent is present at 3 to 30 parts by weight with respect to 100 parts by weight of the mixture, wherein the binder comprises cellulose and is present at 10 to 30 parts by weight of the mixture, and wherein the temperature control agent is in powder form and admixed with the mixture, wherein the mixture comprises 45 to 70% by weight of iron, 2 to 5% by weight of a salt comprising sodium chloride, potassium chloride, or magnesium chloride, 20 to 30% by weight of water, 1 to 15% by weight of activated carbon, and 1 to 10% by weight of vermiculite or water absorptive polymer.

\* \* \* \* \*